(12) United States Patent
Reynolds et al.

(10) Patent No.: US 11,514,464 B2
(45) Date of Patent: Nov. 29, 2022

(54) SURVEY SYSTEM WITH MIXED RESPONSE MEDIUM

(71) Applicant: Batterii, LLC, Cincinnati, OH (US)

(72) Inventors: Chad A. Reynolds, Cincinnati, OH (US); Benjamin L. Vaughan, Cincinnati, OH (US); Jennifer L. Tackett, Cincinnati, OH (US)

(73) Assignee: BATTERII, LLC, Cincinnati, OH (US)

( * ) Notice: Subject to any disclaimer, the term of this patent is extended or adjusted under 35 U.S.C. 154(b) by 0 days.

(21) Appl. No.: 17/575,116

(22) Filed: Jan. 13, 2022

(65) Prior Publication Data

US 2022/0230194 A1 Jul. 21, 2022

Related U.S. Application Data

(60) Provisional application No. 63/137,828, filed on Jan. 15, 2021.

(51) Int. Cl.
  *G10L 15/26* (2006.01)
  *G06Q 30/02* (2012.01)
  *G06F 40/40* (2020.01)

(52) U.S. Cl.
  CPC ......... *G06Q 30/0203* (2013.01); *G06F 40/40* (2020.01); *G10L 15/26* (2013.01)

(58) Field of Classification Search
  None
  See application file for complete search history.

(56) References Cited

U.S. PATENT DOCUMENTS

| 7,237,717 B1* | 7/2007 | Rao ............. H04L 69/16 235/386 |
| 11,250,857 B1* | 2/2022 | Kim ............. G10L 15/22 |
| 2010/0179950 A1* | 7/2010 | Willcock ............. G16H 50/20 707/723 |

(Continued)

FOREIGN PATENT DOCUMENTS

WO 2020232279 A1 11/2020

OTHER PUBLICATIONS

"Voxpopme and Qualtrics Video Dashboard Widget" (Voxpopme via YouTube), Oct. 17, 2019 [online] [retrieved on May 5, 2022]. Retrieved from the Internet <URL: https://www.youtube.com/watch?v=9plm9lDhPpA>.

*Primary Examiner* — Neeraj Sharma
(74) *Attorney, Agent, or Firm* — Ulmer & Berne LLP

(57) ABSTRACT

A system is configured to provide a survey interface that collects response data, including both quantitative and qualitative response data, using multiple capture mediums. Mediums used to capture response data include input forms that collect structured response data on particular questions, as well as multimedia input forms that capture and collect free form multimedia response data in video form. This mix of quantitative and qualitative response data is analyzed across multiple modalities and used to develop an indexed response dataset, which may be queried to determine a set of pre-configured insights. An insight interface visualizes these pre-configured insights and accepts additional queries to provide a query interface that draws from the static indexed response dataset to allow for dynamic, conversational querying for additional insights.

20 Claims, 23 Drawing Sheets

(56) References Cited

U.S. PATENT DOCUMENTS

| | | | |
|---|---|---|---|
| 2010/0241493 A1* | 9/2010 | Onischuk | G06Q 90/00 726/4 |
| 2012/0096073 A1* | 4/2012 | Elwood | G06F 16/957 709/203 |
| 2013/0238974 A1* | 9/2013 | Beltramo, Jr. | G06Q 30/02 715/234 |
| 2014/0351257 A1* | 11/2014 | Zuzik | H04L 67/10 707/740 |
| 2015/0261773 A1* | 9/2015 | Walid | G06F 16/345 707/769 |
| 2015/0358217 A1* | 12/2015 | Wang | H04L 67/55 709/203 |
| 2016/0330144 A1* | 11/2016 | Dymetman | G06F 16/48 |
| 2017/0351653 A1* | 12/2017 | Ramlet | G06Q 30/0245 |
| 2019/0066136 A1* | 2/2019 | Kopikare | G06Q 30/0282 |
| 2019/0139318 A1 | 5/2019 | Tierney et al. | |
| 2019/0164182 A1* | 5/2019 | Abdullah | G06F 16/245 |
| 2019/0174193 A1* | 6/2019 | Wirasinghe | H04N 21/4751 |
| 2019/0213611 A1* | 7/2019 | Duhigg | G06Q 30/0201 |
| 2020/0019611 A1* | 1/2020 | Tutubalina | G06F 40/30 |
| 2020/0342470 A1* | 10/2020 | Morningstar | G06Q 10/067 |
| 2020/0402082 A1* | 12/2020 | Votava | G06F 16/9536 |

* cited by examiner

310

Which part of the shoe do you MOST LIKE?

Share a video WHY you said that!

| RECORD | STOP | SUBMIT |

FIG. 13D ically interpreted, unstructured responses are typically manually considered, relying upon a reviewers subjective experience and approach, in order to develop insights.

SURVEY SYSTEM WITH MIXED RESPONSE MEDIUM

PRIORITY

This application claims priority to U.S. Provisional Patent No. 63/137,828, filed Jan. 15, 2021, titled Survey System with Mixed Response Medium, the entirety of which is hereby incorporated by reference.

FIELD

The disclosed technology pertains to a system for collecting and viewing survey response data.

BACKGROUND

The collection and use of feedback, whether from customers or users of a product or software, supporters of a cause, employees of a company, or other various sources of critique or compliment is an important aspect of many ventures. Gathered information and underlying insights may be used to improve products, identify activities or positions that cause a favorable or unfavorable response from the general public, or determine future strategies for software development or growth, among numerous other uses. Unsurprisingly, receiving high-quality feedback data contributes to the development of high quality insights. High quality insight might include feedback and question responses that are clear and consistent (e.g., "most customers love our new shoe"), but may also include less obvious insights that may be determined from the same or similar dataset (e.g., "customers in colder climates hate our new shoe because it is not water resistant").

Customer feedback mechanisms such as evaluations, surveys, and online analytics can produce limited data and insights due to their pre-generated, rigid nature. As an example, a survey question collecting structured data associated with pre-defined questions, such as "Rate our shoe with a score from 1 to 10" can provide very clear results, but those results will be limited both by the questions asked, as well as the limited and structured format of the responses (e.g., a user can only provide a numeric rating between 1 and 10). Thus, in many cases such feedback mechanisms are unable to gather data usable to identify less obvious insights, and instead primarily provide feedback that is expressly related to the question asked. Despite these limitations, these customer feedback mechanisms are still popular due to the scale at which they can be conducted and relatively low cost.

A conventional approach to gathering less structured feedback might include usability tests, focus groups, and interviews to allow for more open, free-form feedback that may also be interactive. This might include unguided discussion on a particular product or service where the respondent is entirely responsible for the flow of discussion, but may also include guided discussions where an interviewer may direct attention to certain topics, or ask dynamic follow up questions in response to prior discussion. A major drawback to these methods of feedback and data acquisition methods is the significant expense involved both in gathering the data, as well as interpreting the data. This is because, unlike structured data, which is easily programmatically interpreted, unstructured responses are typically manually considered, relying upon a reviewers subjective experience and approach, in order to develop insights.

What is needed, therefore, is an improved system for producing high quality feedback across mixed response mediums.

BRIEF DESCRIPTION OF THE DRAWINGS

The drawings and detailed description that follow are intended to be merely illustrative and are not intended to limit the scope of the invention as contemplated by the inventors.

FIGS. 13A-13F each show a screenshot of exemplary structure, organization, and presentation of response data;

DETAILED DESCRIPTION

The inventors have conceived of novel technology that, for the purpose of illustration, is disclosed herein as applied in the context of feedback and survey systems. While the disclosed applications of the inventors' technology satisfy a long-felt but unmet need in the art of feedback and survey systems, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Implementations of the disclosed system combine qualitative and quantitative responses to questions to allow for certain pre-configured insights to be automatically determined, to allow for conversational style dynamic querying for insights, or both. Providing response data in the form of pre-configured, or "top level" insights, and in the form of "follow up" questions as part of conversational querying, allows for qualitative response data in various mediums (e.g., video, audio, free form text) to be utilized in a scalable and meaningful way.

For example, an online video survey that provides qualitative response data in the form of a video (e.g., images and audio) is desirable since free form video feedback will include information that is broader, and deeper when compared to quantitative, structured data responses. However, review of video response data from an online survey is not easily scalable, and would generally require at least a 1 to 1 ratio of content to review (e.g., 100 hours of video may generally require at least 100 hours of manual review). Thus, a disadvantage of online video feedback becomes the curse of too much data, with some large datasets (e.g., hundreds to thousands of hours of video) being easily gathered, but far more difficult to review, making human assessment impracticable.

By combining qualitative and quantitative response data with each other, and with other information that can be extracted from mixed response mediums, a system may be implemented that can identify meaningful top level insights within large datasets, can allow for conversational style querying of large datasets, or both. Implementations of the disclosed technology may utilize complex distributed computing systems, software architectures, unique user interfaces, machine learning techniques, and other features to quickly extract and analyze non-obvious, insightful data from large datasets including mixed medium response data.

Figure 1:
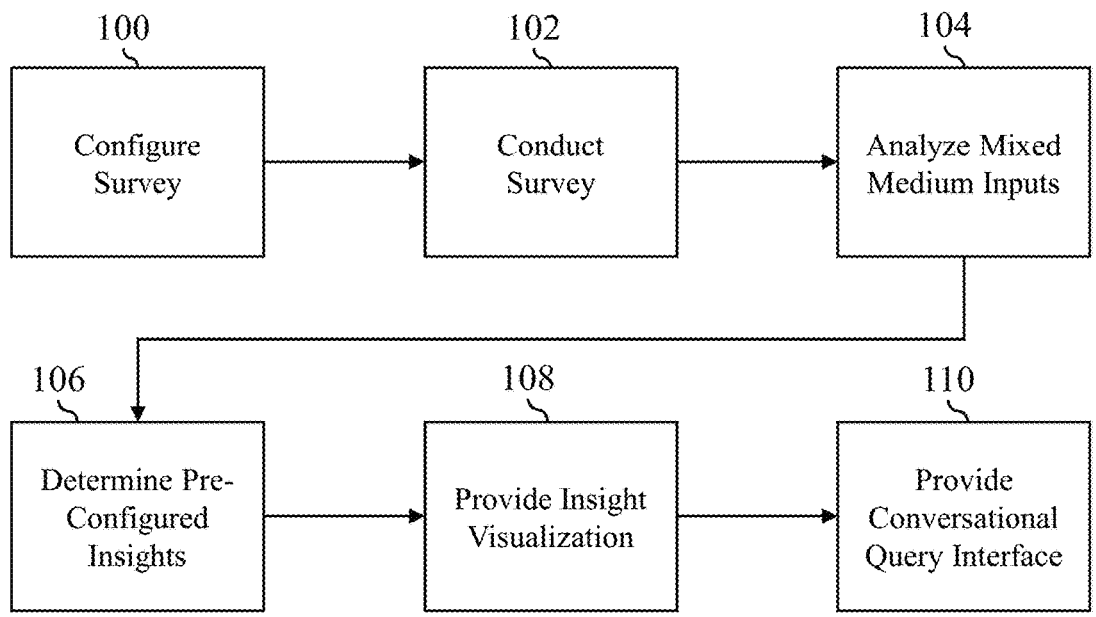
FIG. 1 is a flowchart of an exemplary set of high-level steps that a system could perform to produce high quality feedback using mixed response mediums.

Turning now to the figures, FIG. 1 is a flowchart of an exemplary set of high-level steps that a system could perform to produce high quality feedback using mixed response mediums. Surveys may be configured (100) by users of the system to receive response in qualitative and quantitative forms, and across mixed mediums, which may include, for example, specifying the content of questions, the forms of input (e.g., structured quantitative responses, or free form qualitative responses), the types of mediums available to capture responses (e.g., text, audio, video), the overall visual layout and design of the survey, and the platforms that the surveys may be received on (e.g., the devices or software interfaces via which they may be viewed and responded to, such as mobile phones, personal computers, web browsers, software applications, etc.). Configured surveys may be conducted (102) by the system, which may include providing a survey to a plurality of potential respondents, capturing responses from some number of respondents, and providing that response data to the system for further processing.

The system may then analyze (104) the mixed medium response data to identify any potentially meaningful data contained in the mixed response mediums, and to begin to inter-associate portions of the response data based upon relationships such as semantic similarity or relatedness, temporal relationships, sentiment relationships, or other relationships. Some implementations of the system may use a multi-modal data synthesis approach to analyze and mine large mixed medium quantitative datasets at various levels of granularity to produce these connections. As an example, video response data may be split into multiple modalities (e.g., audio data, image data, text transcript, video metadata) that are analyzed separately and in a multi-modal manner to extract unique data features. Extracted data features may be combined with quantitative response data and other response data, such as demographic data, physiological data from wearable devices, or survey form session context data, for example, to produce additional connections and relationships between response data, and to create the potential for identifying deeper and less obvious insights based on the response data.

The response dataset may then be queried at a high level based upon pre-configured insight queries (topic specific, sentiment specific, demographic specific, time allotment specific, etc.) to determine (106) a set of top level insights represented within the response data. Top level insights may be provided (108) to a user of the system via an insight interface which may include textual and numerical descriptions of insights as well as complex interactive visualizations of the insights. Some implementations of interfaces provided by the system may also include providing (110) a conversational query interface that allows additional, dynamic interactions with the response dataset to search for non-obvious insights or otherwise develop information about insights not represented in the top level insights.

The conversational query aspect of the system is especially advantageous for large datasets of qualitative response data, as it allows for response data to be explored at a high level of granularity based upon prior insights by precisely drawing from the qualitative response data, rather than requiring users to manually review substantial portions of the qualitative response data. With conversational querying of the response dataset, users can explore extracted data features iteratively by using insights previously produced by the framework to generate new queries or refine areas of the data to explore. This may be performed cyclically by leveraging previously derived data features along with new user supplied data directed by insightful visualizations (e.g., such as a diagram identifying commonly used nouns that, when clicked on, query the response dataset for additional insights related to the clicked noun, such as video clips or transcript text where the noun is mentioned).

Users can start with the basic unidirectional analysis (e.g., top level insight analysis), and then can ask new questions based on the results of the unidirectional analysis. New questions are, in effect, asked against the previously generated data features to perform subsequent analysis tasks based on the previously unknown insights. As an example of the above, Once data features are initially extracted from qualitative response data, such as video clips, a first pass may be made on the features to produce an initial insight based on the original objective of the video survey (e.g., such as by executing pre-configured queries against the indexed response dataset to determine top level insights). Visualizations may be produced that provide non-obvious insights concerning the original objectives, and which may be further explored when they are determined to be high value insights for which more information is desired. After a user selects an interesting new avenue of insight exploration, the new query or follow up question may be executed against the indexed response dataset to perform a new analysis focused on the selected subset of the data features, with the results being updated to the insight interface as new or updated visualizations and new possible avenues or directions of insights to explore.

As an example of the above, system may analyze (104) a response dataset provided in response to a quantitative prompt to rate how likely you are to host a party at your home with a score between 1-10, and a qualitative prompt to record a short video discussing your thoughts on hosting a party at your home. One pre-configured insight is to determine, within the qualitative response data, an aspect of hosting a party that is associated with very positive sentiment, and an aspect of hosting a party that is associated with very negative sentiment. The system may execute this pre-configured query on the response dataset and determine that "friend" has a very high positive sentiment across all quantitative responses (e.g., whether a respondent rated their desire to host a party at 1 or 10, all spoke positively about a desire to be with friends in their qualitative response), while "pet" had a very negative sentiment across quantitative responses that indicate a low desire to host a party (e.g., those who rates their desire between 1 and 4 spoke negatively about "pets"), perhaps suggesting that some respondents would be more likely to host a party if some issue relating to a "pet" could be resolved.

Continuing the example, this information could be presented to a user of the system via an insight interface (108) that describes various characteristics of the response data (e.g., number of respondents, questions asked, forms of responses, etc.), descriptions and/or visualizations of the already determined (106) insights, viewable portions of qualitative video data that is related to the determined (106) insights (e.g., audio clips, images, video clips selected from the qualitative response data where respondents were discussing "friend" or "pet"). The system may also provide a conversational query feature (110) that allows the user to query or "ask" the system to provide further insights related to "friend" or "pet". In effect, this simulates a conversational aspect to interacting with the response data, as the response data itself has already been captured and is statically stored, but additional queries may be provided in the form of "follow up" questions related to prior determined insights to gain additional insights from the large response dataset.

Continuing the example, after viewing several short video clips selected from the qualitative data where respondents discuss "pet", the user may use the provided (110) interface to ask about "pet", which may include typing in a free form question, selecting from an automatically generated list of questions, or selecting an interface element that is part of a visualization or other representation of the "pet" insight (e.g., clicking on the word "pet" in a word cloud, or selecting it from a scatter chart or other diagram). Upon selecting "pet" as a follow up question, the system may execute another set of queries against the response dataset using "pet" as a topic of interest to identify frequently associated topics, positive sentiment topics, and negative sentiment topics that are related to "pet". The results of this query may be provided (108) via the insight interface, and may indicate, for example, that negative sentiment about pets is most commonly associated with "cat" and "dog" which, after subsequent follow up questions, themselves are commonly associated with "box" and "walk" (e.g., indicating that many respondents feel negatively about hosting a party due to a need to maintain a cat box in their home, or a need to walk a dog frequently), with each update to the insight interface being coupled with additional information and video clips related to the follow up questions (e.g., a montage of 5-10 second video clips where respondents negatively discuss pets).

A unique value of the above example and general approach is that a high quality, valuable insight may be drawn from a large amount of qualitative data, after the qualitative data has already been statically determined. In other words, the qualitative response data is treated as an ongoing conversation where follow up questions may be asked to dynamically provide new insights, without the need for capturing new or additional qualitative data, and without the need for manual review.

Figure 2:
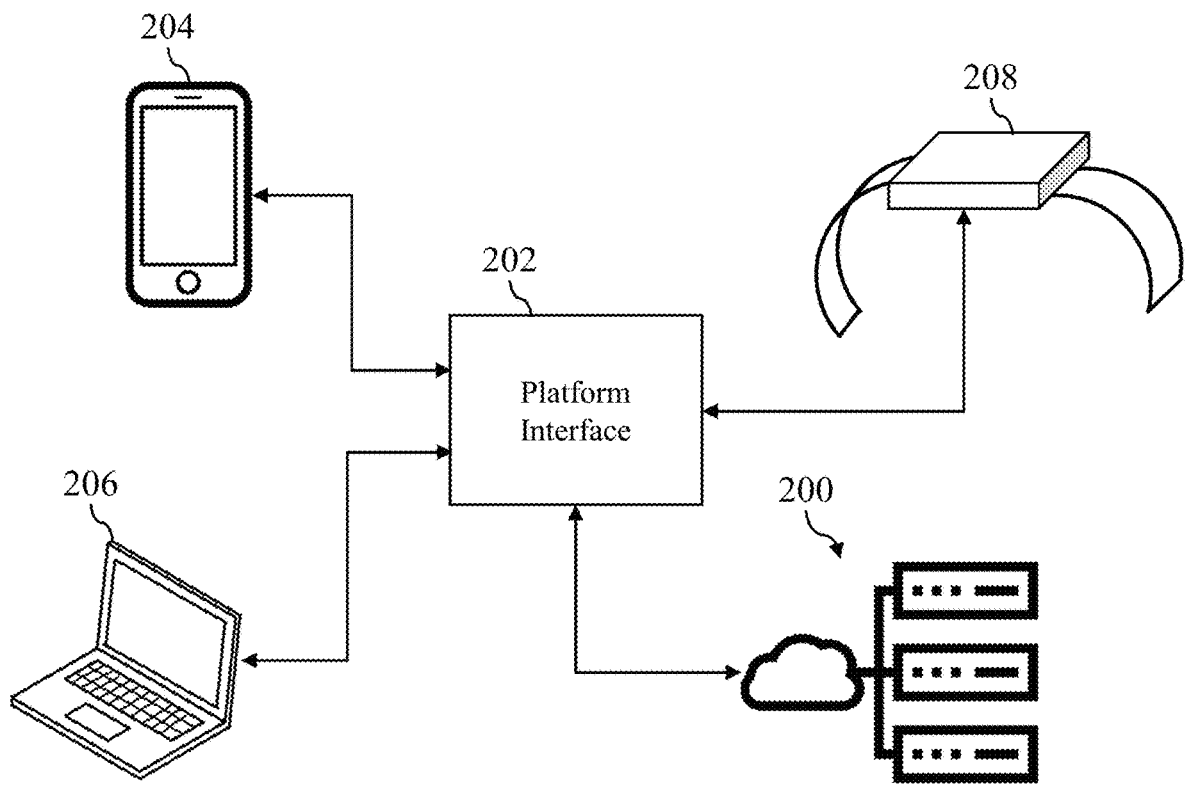
FIG. 2 is a schematic diagram of an exemplary system configured to produce high quality feedback using mixed response mediums.

FIG. 2 is a schematic diagram of an exemplary system configured to produce high quality feedback using mixed response mediums. A server (200) may include one or more physical servers, virtual servers, cloud servers, or other servers or server environments capable of receiving, transmitting, storing, manipulating and creating data, and communicating across a network such as the internet. The server (200), whether a single device or many, may include processors, memories, storage drives, communication devices or interfaces, and other components as will be apparent to those of ordinary skill in the art in light of this disclosure. The server (200) may be configured to perform various processes, such as those described in FIG. 1 and elsewhere, and may be further configured to provide, expose, or enable one or more platform interfaces (202) to or for devices of users of the system (e.g., respondents, survey creators).

Platform interfaces (202) may include APIs, web services, websites, software applications, or other communication interfaces by which surveys may be provided to respondents, and response data may be provided to the server (200). User devices in communication with the platform interfaces (202) may include, for example, mobile devices (204) (e.g., smartphones, tablets, other handheld computing devices), computers (206) (e.g., desktops, laptops, other computing devices), and wearable devices (208) (e.g., fitness trackers, smartwatches). User devices may receive surveys and provide response data, or may provide additional types of response data, such as in the case of wearable devices (208) which may provide, for example, heart rate measurements, exercise or activity information, or other information which may provide additional opportunities for insight identification.

Figure 3A:
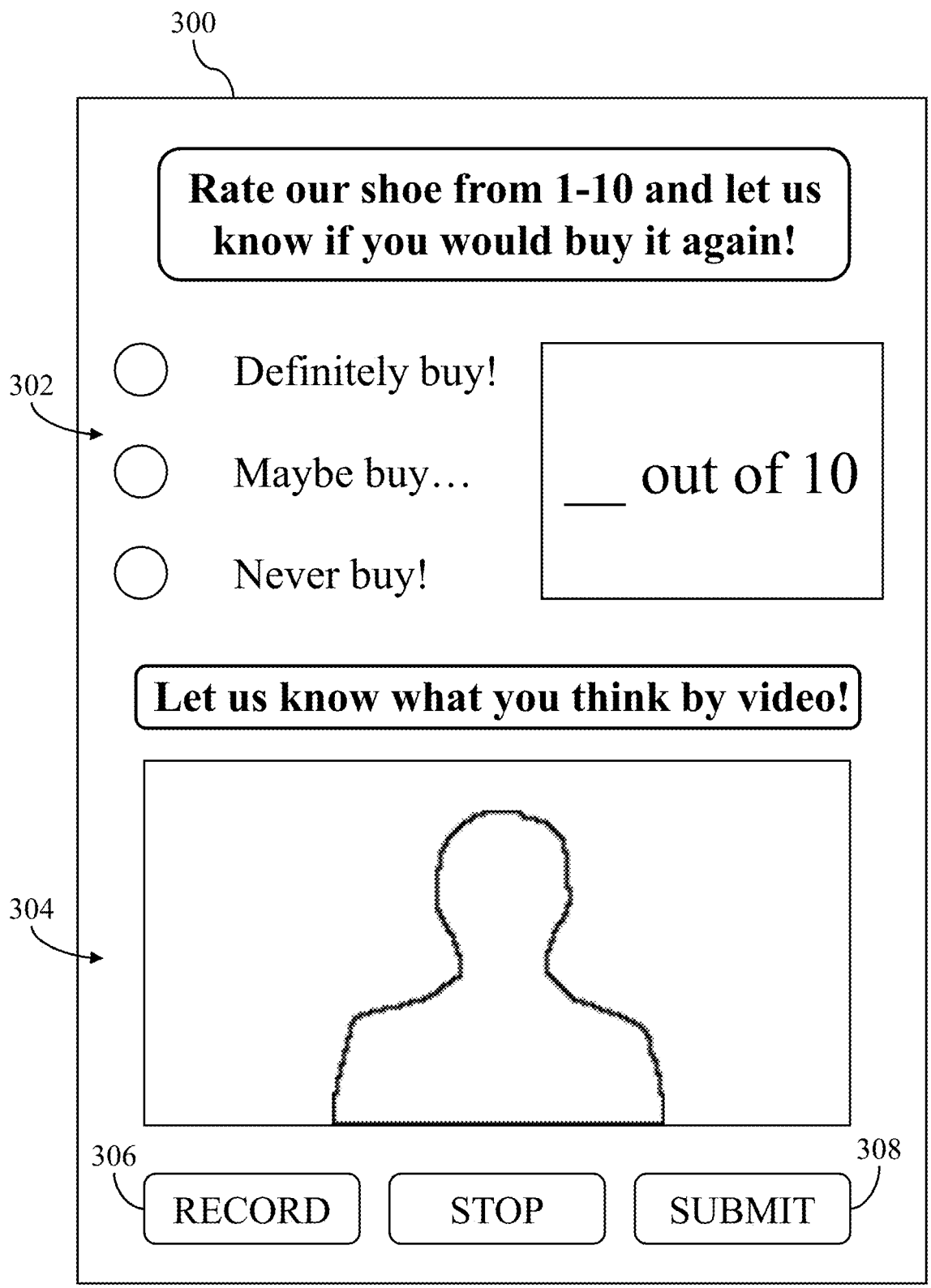
FIG. 3A is a screenshot of an exemplary survey interface.

FIG. 3A is a screenshot of a survey interface (300), such as may be provided to a user device via the platform interface (202) as part of conducting (102) a survey. The survey interface (300) includes a quantitative response section (302) with one or more quantitative prompts (e.g., "Rate our shoe from 1-10 . . . ") and corresponding inputs that are configured to receive structured inputs, such as drop down menus, checkboxes, radio buttons, or other interface elements for selecting or inputting certain structured or typed data. The interface (300) also includes a qualitative response section (304) with one or more qualitative prompts (e.g., "Let us know what you think by video!"), and controls for providing qualitative responses via one or more mediums. The interface (300) of FIG. 3A prompts the user for video input, and provides additional related controls such as a record button (306), a stop button, and a submit button (308) that the user may interact with in order to record, preview, re-record, and submit response data. Other implementations of a qualitative response section (304) might include picture capture, audio capture, free form text input, and other response medium inputs.

The interface (300) advantageously includes both quantitative (302) and qualitative (304) sections in a single form, session, or transaction, as opposed to prompting for such responses at separate times, or during separate stages of an ongoing survey. In this manner, the different response types and medium types are readily related to each other during analysis (104) of the response inputs, as compared to response that may be separately prompted for, or provided, which may result in incomplete submissions (e.g., either quantitative, or qualitative response portions are skipped), or submissions that are less closely related by the respondent themselves (e.g., after the passage of time, loading of new interfaces, or other actions where prompts are separately provided, the respondent's state of mind relating to the prompts may have changed).

Figure 3B:
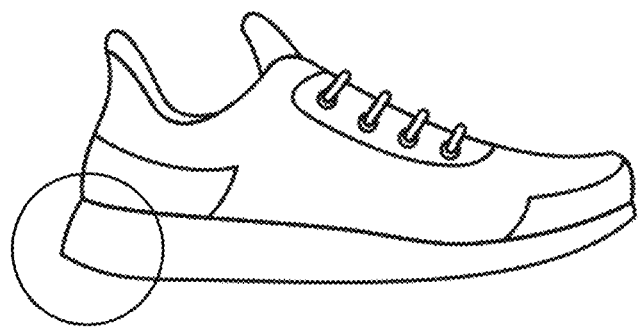
FIG. 3B is a screenshot of another exemplary survey interface.
Figure 3B:
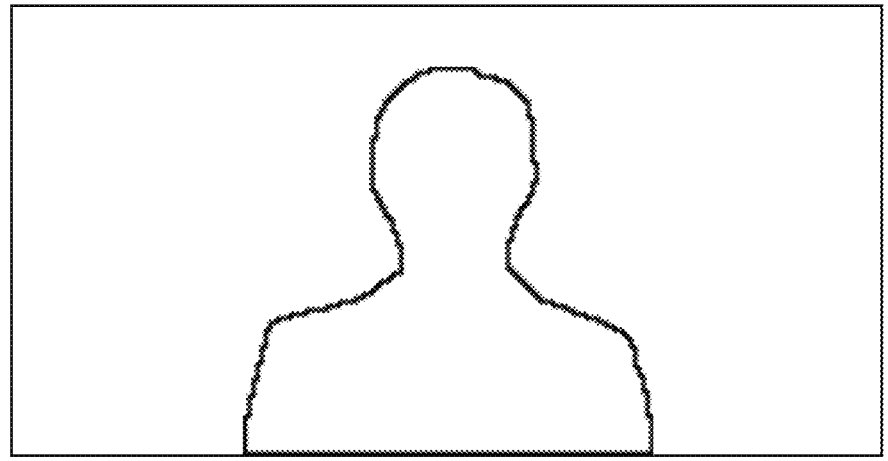

FIG. 3B provides another example of an interface (310) such as may be provided to a user device via the platform interface (202) as part of conducting (102) a survey. The interface (310) includes both quantitative and qualitative response prompts, with a clickable, slidable, or selectable designator that may be placed over an image (e.g., either a sample image, or an image previously provided in response data from the respondent) to quantitatively identify a portion of the depicted object (e.g., the heel of a shoe, the shoelaces, etc.) as being responsive to the question, as well as a qualitative video response prompt that relates to the quantitative answer. Other quantitative question types may include, for example, multiple choice, Likert scaling, hotspot selection (e.g., select the part of this image that you like most), multiple choice ordering (e.g., order these from favorite to least favorite), and other question types and designs. Selections may be made by checkbox, radio button, word cloud navigation, drag and drop ordering, clicking to enable/disable, toggling buttons, drag and drop into buckets, and other interactions.

Figure 3C:
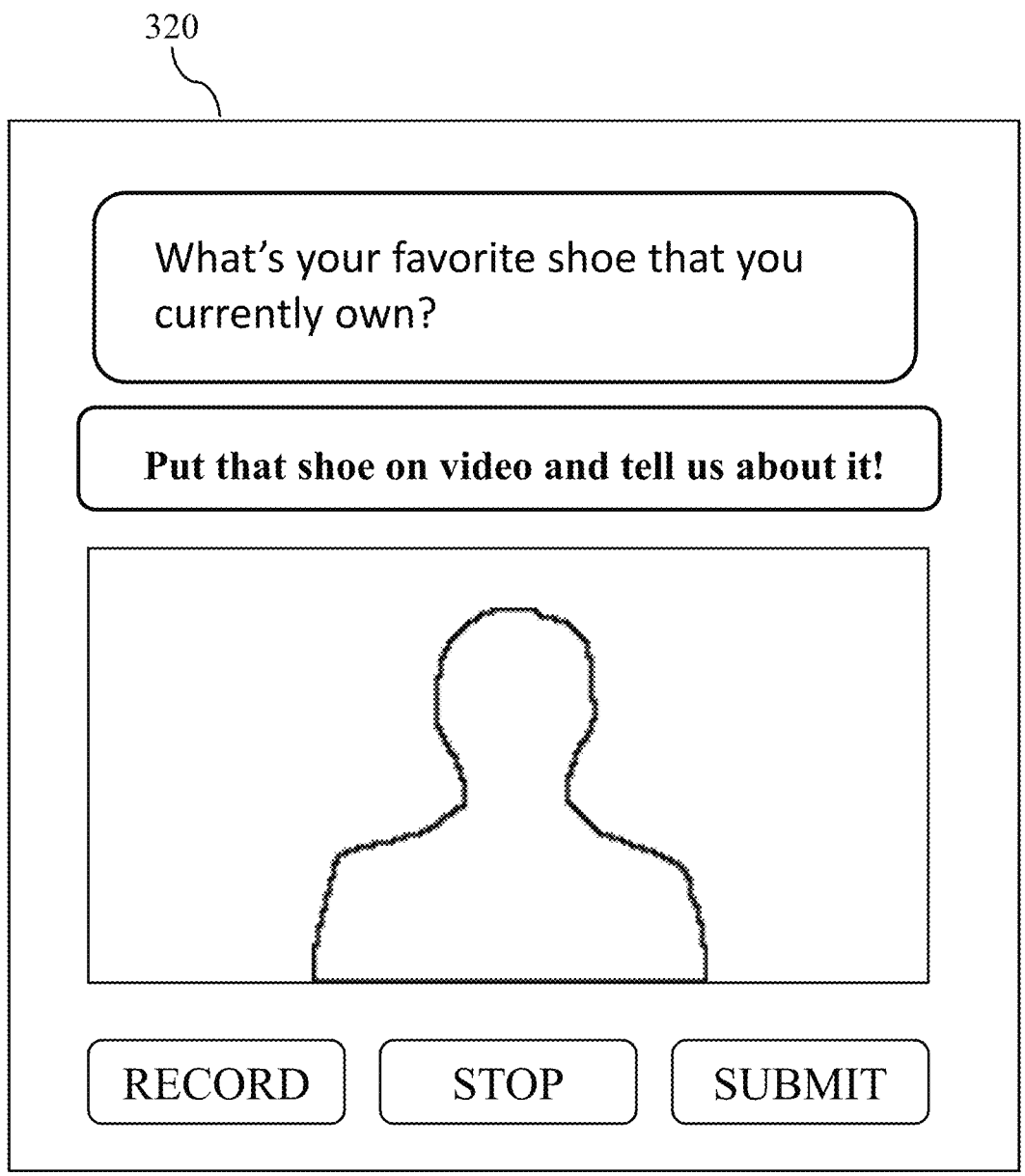
FIG. 3C is a screenshot of yet another exemplary survey interface.

FIG. 3C provides yet another example of an interface (320). The shown interface (320) includes a qualitative response prompt for video response data, which may be presented independently of a quantitative response prompt, or which may relate to a previously provided response prompt (e.g., a quantitative question asked and answered in a prior interface (300, 310)).

Figure 3D:
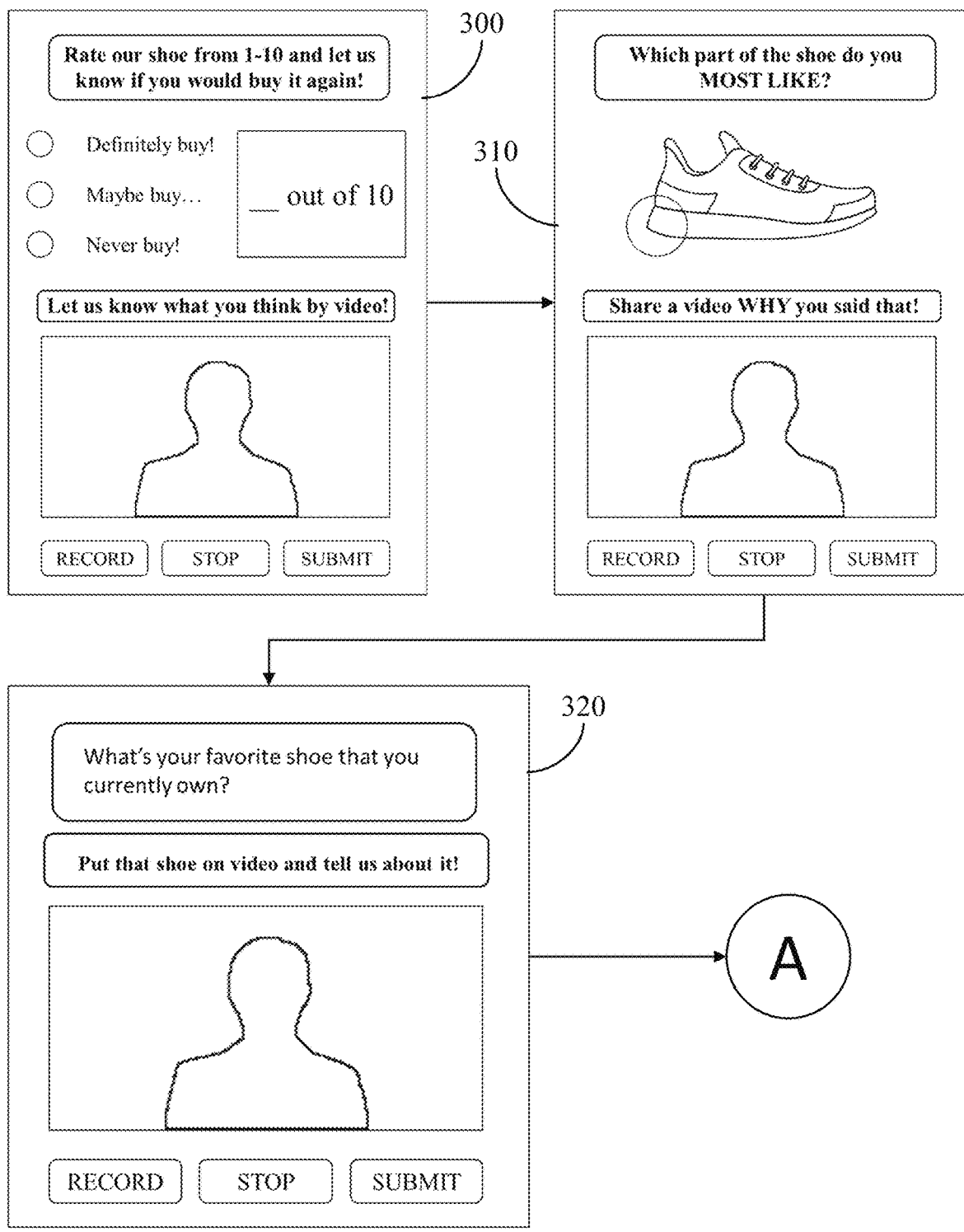
FIG. 3D is a flowchart of an exemplary set of interfaces that may be presented in sequence to prompt for mixed medium response data.
Figure 3E:
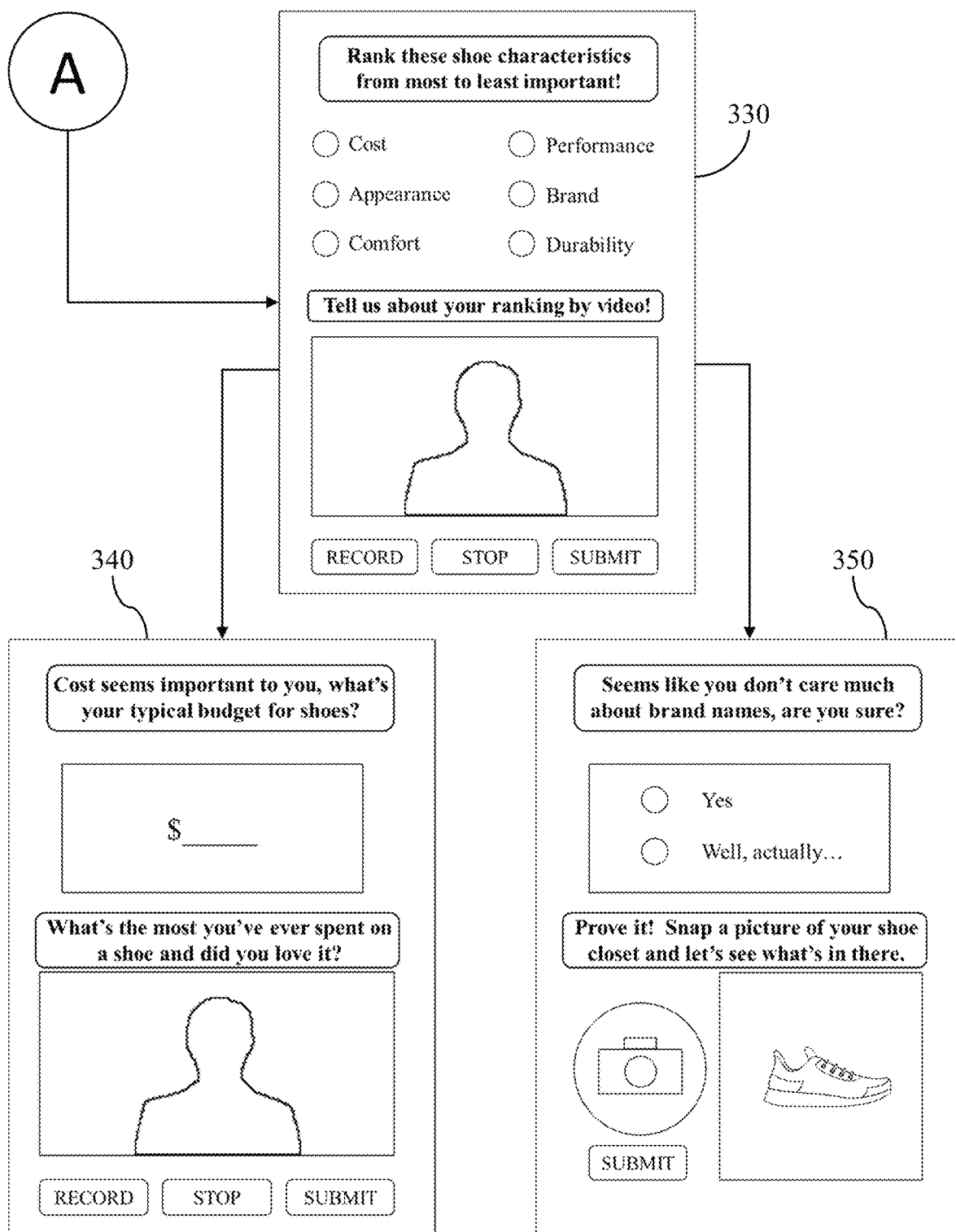
FIG. 3E is a flowchart continuing the sequence of FIG. 3D.

FIGS. 3D and 3E show a flowchart of interfaces that may be presented to a respondent, in sequence, with some interfaces being based in part upon response data received from prior interfaces. At a first step, the interface (300) of FIG. 3A may be presented. After receiving response data from that interface (300), the interface (310) of FIG. 3B may be presented. After receiving response data from that interface (310), the server (200) may determine, based upon prior quantitative response data, qualitative response data, or both, that the interface (320) should be presented. As an example of the above, where a respondent provides response data via the interface (300) indicating the shoe is a "Maybe buy . . ." with a score of 5/10, the server (200) may be configured to automatically prompt for additional information about a shoe that the respondent would likely rate as "Definitely buy!" or score higher than a 5/10 (e.g., their favorite current shoe). In this example, the qualitative response data received via the interface (320) provides a rich source of data that may be used to determine further insights that relate to the response data from the prior interface (300, 310).

Moving from the circular indicator "A" in FIG. 3D to the same in FIG. 3E, an interface (330) may then be provided to gather further response data that may be used to determine insights related to earlier response data. Continuing the above example, analysis of prior qualitative response data, quantitative response data, or both may have been inconclusive in providing insights related to the respondent's initial scoring of the shoe via the interface (300). The interface (330) may be provided to gather additional quantitative and qualitative data about shoes more generally (e.g., what are the most important characteristics of a shoe?). As with prior examples, analysis of the quantitative response data, qualitative response data, or both may be used to automatically provide one or more subsequent interfaces.

An interface (340) may be provided where quantitative response data indicates that "Cost" is the most important characteristic to the respondent, and the interface (350) may be provided where quantitative response data indicates that "Brand" is the least important characteristic to the respondent. Response data from the interface (340) may be used to lend credibility to the respondent's prior response data on "Cost" being important, as the quantitative response may indicate that the cost of shoes being low, average, or high is important, while the qualitative video response may indicate how closely the cost correlates to satisfaction. Response data from the interface (350) may be used to lend credibility to the respondent's prior response data on "Brand" being unimportant, with the quantitative response confirming whether it is truly unimportant, or just less important than other quantitative responses, and the qualitative response data being usable to lend further credibility to the response data (e.g., a submitted picture shows several pairs of shoes that image analysis indicates are of different brands, or the same brand) or to provide other insights related to the respondent (e.g., several pairs of shoes that image analysis indicates are running shoes may suggest an athlete demographic).

A sequence of survey interfaces such as the above may continue until all statically configured and/or dynamically generated survey interfaces have been provided to the respondent, or may continue indefinitely with the server (200) determining, upon each submission, some aspect of the prior quantitative response data, qualitative response data, or both to further investigate for the purposes of providing rich data for insight determination.

Figure 4:
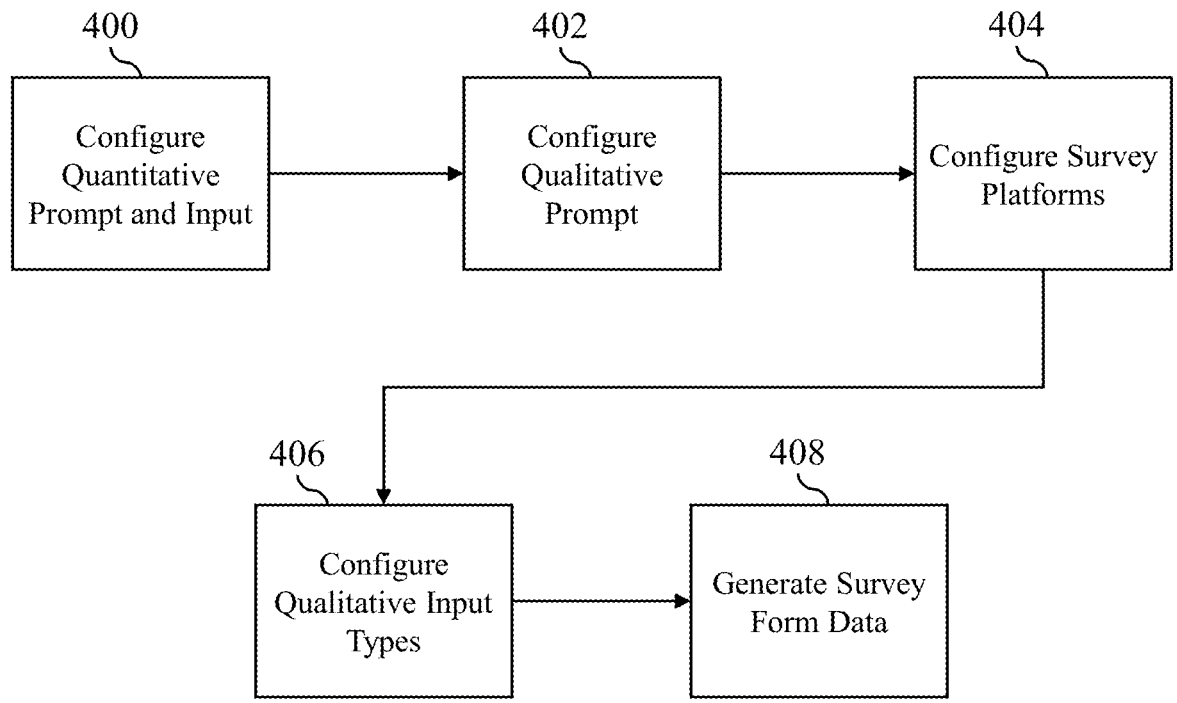
FIG. 4 is a flowchart of an exemplary set of steps that may be performed to configure a survey with mixed response mediums.

FIG. 4 is a flowchart of an exemplary set of steps that may be performed to configure a survey with mixed response mediums. The steps include configuration (400) of a quantitative prompt and input, which may include providing text or images that may be displayed to present a question to a respondent, as well as defining the structure and type of input by which a response may be provided. As has been discussed, structured inputs provide response data that is quantitative and readily usable programmatically due to the limitations on the type and form of the input (e.g., inputs may be strictly typed as integers of varying length or content that correspond to ratings or, in the case of drop down boxes or menus, numeric identifiers of inputs).

A qualitative prompt may also be configured (402), which may include providing text, images, or other materials providing a question or instruction for providing qualitative response data in one or more mediums. One or more platforms that the survey is intended for may also be configured (404), which may include specifying user devices, operating systems, software applications, web services or websites, or other platform interfaces (202) by which the survey may be conducted. Quantitative input types may also be configured (406), which may depend in part upon the configured platforms (404) to determine which mediums are available for qualitative response input. For example, where the survey is configured for mobile devices (204) such as smartphones, qualitative input types may utilize built in cameras, microphones, or other sensors in order to capture qualitative response data in one or more mediums. Where the survey is configured to be conducted by website, agnostic to particular devices or device capabilities, qualitative input types may instead be limited to free form text or other device agnostic input medium.

A set of survey form data may be generated (408), which may include generating a software application, electronic message content, software application module, web location, or other dataset that may be executed or accessed by respondent user devices in order to view and participate in the survey. As an example, where a survey may be delivered via email, website, or hybrid mobile application, generating (408) the survey form dataset may include generating HTML content that will display question prompts and input options when interpreted by respondent devices.

Figure 5:
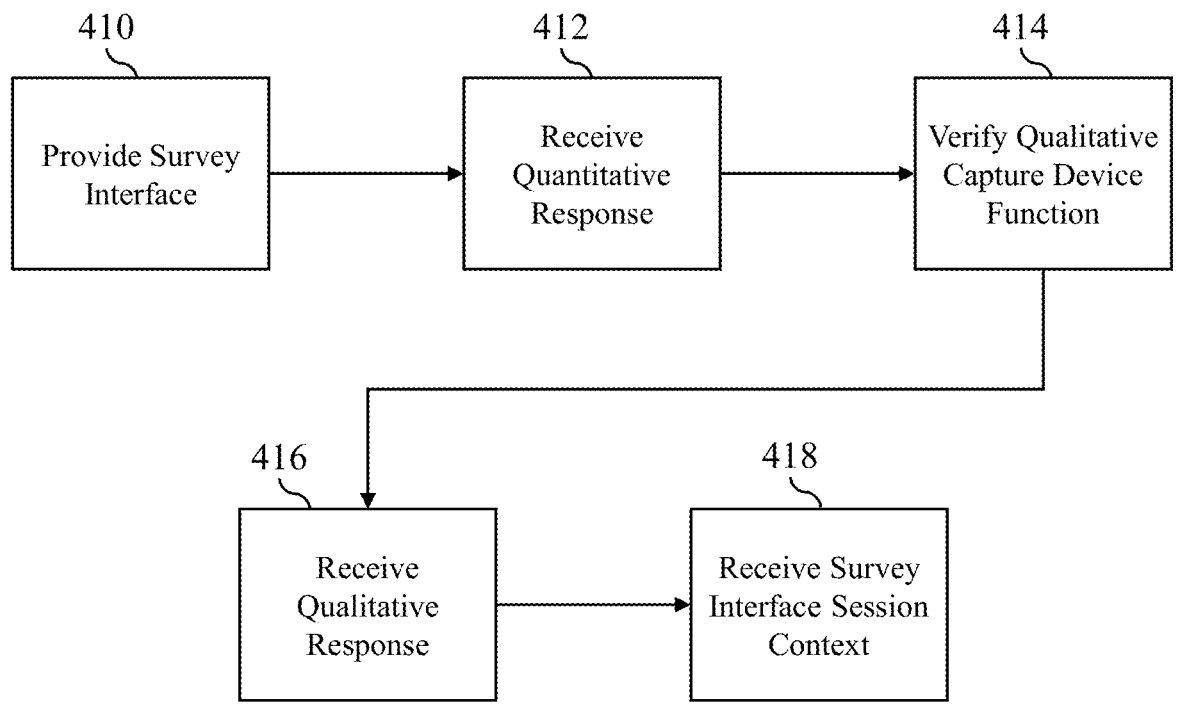
FIG. 5 is a flowchart of an exemplary set of steps that may be performed to conduct a survey with mixed response mediums.

FIG. 5 is a flowchart of an exemplary set of steps that may be performed to conduct a survey with mixed response mediums. A survey interface may be provided (410) to the respondent user device, as has been described above. A quantitative response may be received (412) via the survey interface, which may occur as a result of the respondent clicking a button of the interface or otherwise causing the response to be received at the server (200), or may occur as a result of asynchronous transmission via the survey form as soon as the response is entered, for example. The respondent user devices qualitative response capabilities may be determined or verified (414) prior to capturing qualitative response data. Types of verification may depend upon the various mediums through which qualitative response data may be captured, and may include verifying function of a microphone, verifying function of a camera, or verifying the function of other sensors of a user device.

Qualitative response data may then be received (416) via the survey interface, in one or more mediums, as may be configured for a particular survey. The survey interface may allow respondents to review or replace qualitative response data, such as by playing a preview of captured video comments prior to submission. As with prior response data, received (416) qualitative response data may be submitted to the server (200) based upon the respondent clicking a submit button or taking some other action via the survey form, or may be captured asynchronously as it is received at the survey interface (e.g., video or audio capture may be streamed to the server (200) as it is captured).

Survey interface context may also be received (418) by the server (200). This contextual data may include device and application level variables, information, or other characteristics that describe a particular respondents interactions with the survey interface. As an example, this may include website session context, user activity tracking information (e.g., mouse locations, click locations, touch locations, and other form interactions, which may be tracked by a software application or script), time spent taking the survey, time between receiving the survey and opening or completing the survey, and other information. Such context information may be useful, as it may indicate the order in which questions were answered (e.g., did the respondent answer the quantitative, or qualitative prompt first?), whether the user changed any responses prior to submitting (e.g., revising a quantitative response after capturing a qualitative response), and other user activity on the survey form.

Figure 6:
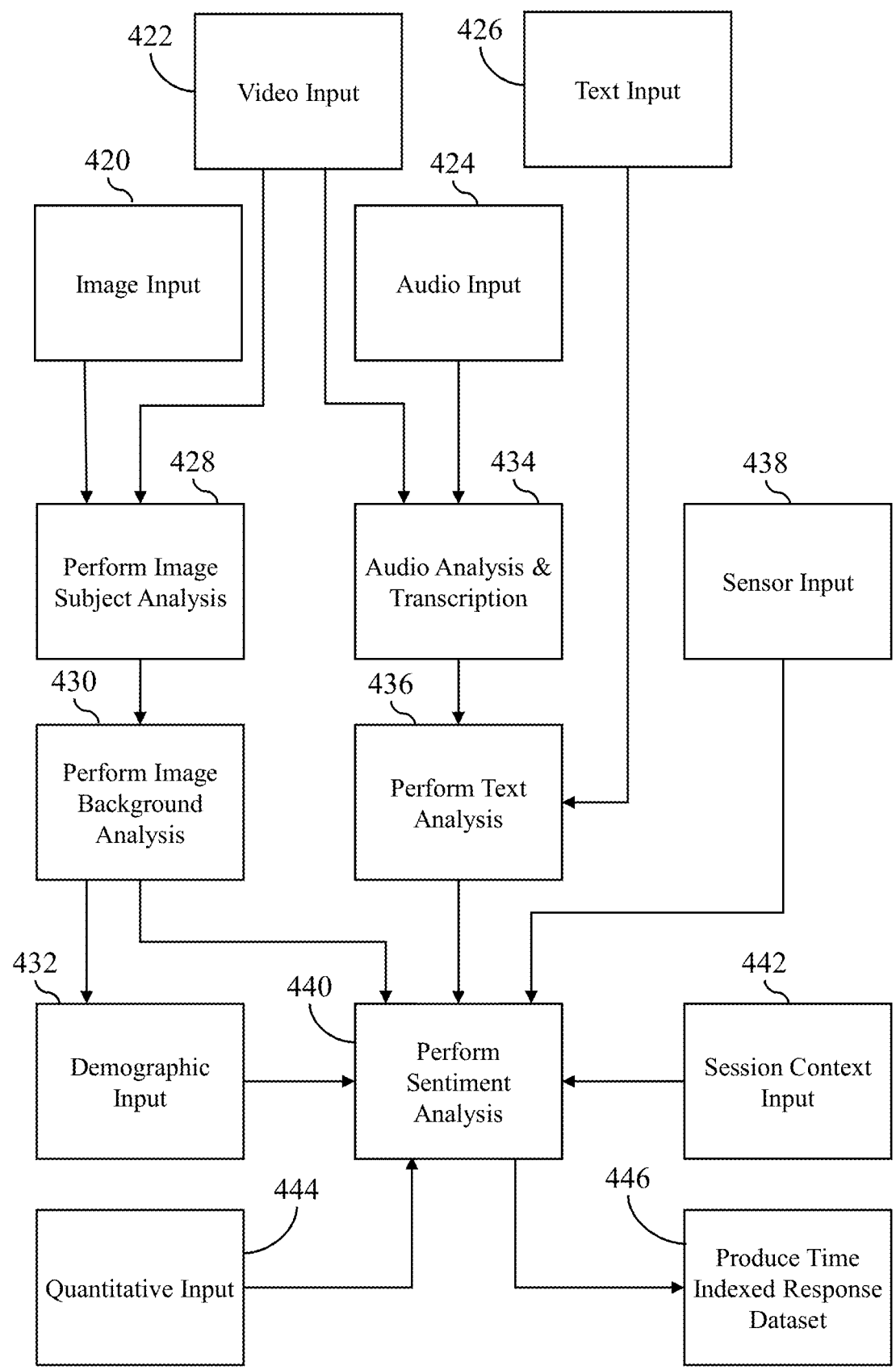
FIG. 6 is a flowchart of an exemplary set of steps that may be performed to produce a response dataset from mixed response medium survey results.

FIG. 6 is a flowchart of an exemplary set of steps that may be performed to produce a response dataset from mixed response medium survey results, such as may be performed when response data is received from one or more respondents. As has been described, received response data may include, for example, quantitative input (444), image input (420), video input (422), audio input (424), free form text input (426), session context input (442), demographic input (432) (e.g., which may be expressly specified by a respondent, or may be determined based upon other response data, as will be described in more detail below), or sensor input (438) (e.g., physiological measurements, activity tracking data, or other information from wearables or user devices). Received qualitative response data may be split into multiple modalities, and analyzed using modality specific techniques to extract unique data features, such as meaning, sentiment, or relatedness to other response data.

As an example of this multi-modality approach, videos are a data dense media that can contain useful information but are mixed with spurious data that can hinder the extraction of meaningful insights. Spurious data could include background noise, video frames where the subject is off screen, and verbal utterances such as "um", "uh", or other verbal or non-verbal pauses. Some of the spurious elements can be removed or mitigated by decomposing the video data into multiple modalities: still images, audio, and text transcripts. However, the richness of the data can be lost when examining only one component of video responses. The analysis addresses this risk by decomposing the video into various modalities which can be analyzed independently and then combined to produce multi-modal insights. While additional examples are provided below, one example of a multi-modal analysis would be combining audio and textual sentiment with facial expressions derived from video frames to detect sarcasm and other inconsistent responses. In such a case, natural language processing or other text analysis may determine an incorrect sentiment because sarcasm is often lost in text-only responses.

Referring to FIG. 6, received image inputs (420) such as one or a sequence of still images may be analyzed (428) using machine vision techniques (e.g., object detection, edge detection, facial detection) to identify characteristics of the foreground, or the subject of the image (e.g., an image of the respondent themselves, an image of an object related to the question prompts), and also to identify characteristics of the background (430) of the image (e.g., a setting in which the image was captured, objects or persons present in the background of the image). Image subject analysis (428) and background analysis (430) may also be performed on one or more image frames taken from a received video input (422). Image analysis may be used to identify objects present in an image (e.g., identify a particular product that may or may not be closely related to the topic of the survey, such as a particular shoe that the survey is directly inquiring about, or a particular shoe that is incidentally in the possession of many respondents to an unrelated survey), text present in an image, people present in an image (e.g., presence and number of people, as well as potentially physiological data such as age, facial emotion, race or ethnicity, facial or other hair style, etc.), and other image characteristics. Image analysis results may provide demographic inputs (432)

related to the survey respondent, or such inputs may be expressly provided by the respondent (e.g., as quantitative response data).

Received audio input (424), as well as audio track data from a received video input (422) may undergo audio analysis (434) to identify characteristics of the audio track such as voice tone, emotion (e.g., enthusiasm, sadness, disinterest), presence of music or other audio sources in capture environment, or other information, and also to produce text transcription. Text transcription, as well as free form text inputs (426) may undergo text analysis (436) to identify the underlying meaning of the text, and semantic relationships and content, for example.

General sentiment analysis may also be performed (440) based upon raw response data, as well as upon the results of various other analyses. For example, this may include using quantitative input (444), session context input (442), sensor input (438) (e.g., heart rate or other physiological indicators that may suggest a certain emotion or frame of mind), audio analysis (434), text analysis (436), image subject analysis (428), image background analysis (430), and other response data to determine the respondent's sentiment as it relates to the qualitative response data (e.g., positive sentiment, negative sentiment, undecided, etc.). The results of sentiment analysis (440), as well as other inputs and analysis results described in the context of FIG. 6, may then be used to produce (446) a time-indexed response dataset for the survey response, such as the example provided in Table 1. The indexed response dataset may take the form of a timeline in which events occurred during the survey, which may span from the start of the survey (e.g., the survey form being opened or accessed) or may cover ranges of time in which qualitative responses were being captured (e.g., a timeline of an audio or video recording). The results of other response inputs, as well as the results of analysis of response inputs may be associated to this timeline to create temporal and/or spatial associations between response data and analysis.

TABLE 1

Exemplary response timeline (0 sec) survey begin
(12 sec) cursor placed in quant response box
(18 sec) quant response input provided
(25 sec) windows scrolls to qual prompt
(45 sec) video recording for qual response begins
(45 sec-95 sec) timeline of video
(95 sec) video recording for qual response ends
(115 sec) cursor placed in quant response box
(120 sec) quant response input modified
(130 sec) survey submitted As an example using the timeline in Table 1, the indexed response dataset may be queried by time to determine what response data and analysis is associated with a particular time, such as at the 65 second mark, while a video response was being captured. Such a query might return one or more words of a transcript of spoken words from the video response at that time, as well as image analysis (428, 430) of captured video frames at that time, audio analysis (434) of captured audio tracks at that time, text analysis (436) of the transcript of spoken words, sentiment analysis (440) based on a variety of response data and other analysis at that time, and session context (442) for how the respondent was interacting with the survey interface tat that time. As further example, the indexed response dataset may be queried based upon parameters other than timeline position, such as a word query (e.g., a query for "pet" may return any moments on the survey or video timeline related to "pet", as well as any image analysis, audio analysis, transcript analysis, or other analysis related to "pet"), image query (e.g., a query image may return similar images, images with similar objects, moments in a video timeline with similar images), sentiment query (e.g., a query for positive sentiment may return moments in a survey timeline or video timeline where analysis identified positive sentiment, or images, audio tracks, transcript text, or other text associated with positive sentiment), or other query types.

While the indexed response dataset has been described as a data structure that may be "queried", it should be understood that it may be implemented in varying forms. In some implementations, the indexed response dataset may be stored as records in a relational database, while in other implementations the indexed response dataset may be stored as a set of object oriented programming data structures (e.g., an object of type "indexedResponseDataset" may include its own sub-objects, collections, and variables, as well as its own function calls to allow "querying" of the data structure as has been described). Other possible implementations of the indexed response dataset exist and will be apparent to those of ordinary skill in the art in light of this disclosure.

Additional examples and aspects of video modality analysis exist beyond those described above. For example, a key component in video analysis is the time ordering of the data, as has been described. By preserving timestamps or intervals for objects in other modalities (video frames, audio clips, spoken words or sentences), time series representations of the data can be preserved and interrelated. This allows various data features to be extracted from the sequenced video frames that could not be obtained from still images only, such as automatic inventory of items displayed or presented during the video, or the use of the time sequence of events within the video to tell a story or explain a consumer journey such as the steps taken during a buying process. A further advantage is that still image analysis, without the context provided by a sequence of frames, can generate spurious results by interpreting transient events as significant. For example, still images of people speaking often show funny facial expressions that are often incorrectly interpreted when analyzing sentiment or other characteristics. Video analysis allows for multiple frames to be analyzed together, within the same context, to remove spurious results. As another example, analyzing still images for a frown or a smile may produce erroneous results since a smile does not instantly appear but appears over a series of frames. Dedicated video analysis within a multi-modality analysis approach allows the detection of genuine facial expressions while filtering spurious results.

As further example of image analysis, images (e.g., one or more still images, or video decomposed into a sequence of independent still images) received by the system may be analyzed in various ways. Data features extracted from each still image may include objects recognized within the frame such as a shoe, soda can, person, or other object. This allows for video surveys where the respondent can visually show their response to a question such as "what is inside your refrigerator?" Other data generated by image analysis may include brands recognized within the frame, which may allow for video surveys where the brands of the respondent's shoes can be detected if they were asked to show their shoe collection, for example. Other image analysis may include facial expression detection, to allow for facial sentiment analysis and the detection of perceived interest or enthusiasm, physical features of the respondents such as hair color, hair texture, type of haircut, skin complexion, makeup usage, eye color, perceived age, and other characteristics, which allows for subgrouping respondents for analysis without explicitly asking for such information. For example, a hair care product might be positively viewed by people with curly hair while negatively viewed by people with straight hair.

Data features extracted from still images can be combined to provide deeper insights such as combining detected facial expressions with an object presented to extract sentiment towards the object. Further, due to the plug-in nature of the machine learning models and the multi-modal analysis framework, customized models can be developed and used. For example, a drop-in, product-space specific machine learning model may be configured to identify significant objects in still-frames extracted from the video and filter spurious objects (e.g., rather than trying to recognize every object depicted in an image during a survey related to shoes, a shoe specific, trained object recognition model may be executed based upon a pre-configured topic of focus for the survey, or based upon a prevalence of a topic exhibited by the respondent's inputs, while separate models trained to identify cars, product logos, major home appliances or other objects are available to the system but not executed).

As further example of audio analysis with a multi-modal analysis framework, audio tracks (e.g., from a video, or direct audio recording) may be analyzed independently to extract data features that are recombined with video features for multi-modal analysis. Example data features and analysis tasks may include audio emotion analysis, detection of enthusiasm or apathy based on vocal inflections, detection of nervousness or confidence in voice, and accent detection. Audio analysis can leverage the power of video surveys by using questions that require multi-media responses. For example, prompting the respondent to play their favorite workout music while doing an exercise as part of their response. The audio properties of the music played can be used to partition respondents into subgroups based on preferences without directly asking for their musical preferences. As has been described, another significant use of audio response data is to produce a text transcript of speech through automated audio analysis and transcript generation.

As further example of text analysis, converting speech into text transcripts allows the use of the richness of language to extract a significant amount of information from a video. For example, natural language processing (NLP) of text transcripts preserves the connection between words and sentences with the timestamps they were spoken allows the combined synthesis of visual, audio, and textual data.

As further example of demographic analysis, the ability of video surveys to collect quantitative and demographic data as well as video data allows the user to move between levels of granularity in the obtained data. Including all respondents in the analysis gives an overview of the results but can lose sight of some finer details. Having the ability to obtain direct data for differentiating subgroups as well as determining implicit partitions of the data allows for both hypothesis testing as well as exploratory data analysis.

As another example of a multi-modality analysis, consider an example where response data is being provided related to hair care products and different types of hair. Individual frames from the video are analyzed to determine the hair type of the respondent, which is then used to augment the text transcript derived from the audio. This augmented data can be used to perform a subgroup analysis of the results from natural language processing of the transcripts. Additional data modalities can be used to further augment the data used in the main analysis. In the survey, respondents were not asked about their hair type during the video survey, but the survey provider was interested if there were differences in the responses based on the respondent's hair type. The main data analysis may be performed using NLP on text transcripts derived from the audio track of response data. Still images extracted from the video may be used to identify the various hair types of the respondents, and such analysis may be merged with the transcripts. Based upon the analysis, the survey provider is now able to examine the differences between the entire respondent population and subgroups based on their hair type. In this example, the use of additional data modalities extracted from the same videos as the main data allows the user to explore the dataset in new ways without having to redesign the survey or provide a new survey.

As further example of sentiment analysis, a set of video transcripts may be parsed to extract parts of speech and word dependency relationships. Noun phrases are extracted from the parsed transcripts, and sentiment analysis is performed on the various sentences containing each noun phrase. Each noun phrase is clustered semantically to group words with similar meanings. Statistical analysis is performed on the sentiment scores for each cluster to provide the user with the overall sentiment within the selected video for each noun-phrase cluster. The results of the statistical analysis is provided to the user through various visualizations that provide interactivity to allow the user to examine the overall results as well as sentence-level results. Based upon dependency relationships, the user can explore the relationship between various noun phrases that are viewed positively, negatively, or neutrally using relation graphs. The user can select various noun phrases to jump to the timestamp in the corresponding videos where the sentence was spoken as well as generating vignettes that combine each utterance of a noun phrase. The resulting positive, negative, and neutral sentences can be combined to form new datasets for further analysis using different methodologies.

Figure 7:
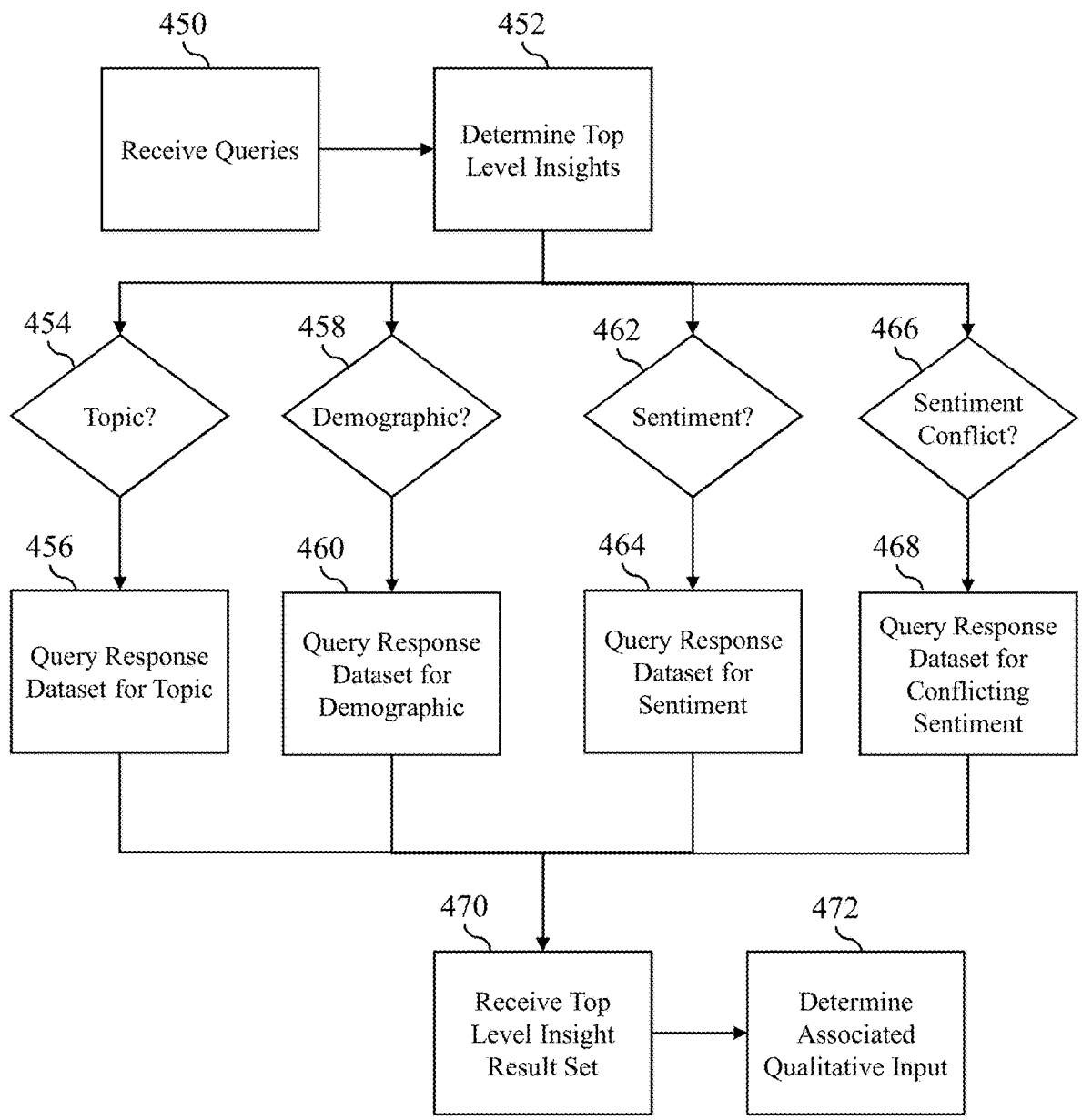
FIG. 7 is a flowchart of an exemplary set of steps that may be performed to determine a set of pre-configured insights based on mixed response medium survey results.

FIG. 7 is a flowchart of an exemplary set of steps that may be performed to determine a set of pre-configured insights based on mixed response medium survey results. With a set of response data analyzed (104) for one or many respondents, the server (200) may automatically perform further analysis for insights based upon received (450) pre-configured queries, which may be configured and executed for all respondents across all surveys (e.g., globally), or may be configured on a per-survey basis (e.g., configured when the survey itself is configured (100)), for example. By executing the received (450) pre-configured or default queries the server (200) may determine (452) one or more top level insights based upon the response data. Top level insights will vary by implementation and configuration, but may include, for example, response data highlighted or organized by specific topics (454) (e.g., related to specific products, specific product features, specific companies or brands, or other key words or phrases), response data highlighted or organized by specific demographics (458) (e.g., geographical location, income level, gender, race, ethnicity), response data highlighted or organized by sentiment (e.g., negative sentiment, positive sentiment, neutral sentiment), or response data highlighted or organized due to conflicting sentiment (e.g., quantitative response data indicates positive sentiment, while qualitative data indicates negative sentiment).

Depending on the pre-configured top level inquiries to the response dataset, the server (200) will then execute one or more queries against a response dataset, such as a previously produced (446) indexed response dataset. Continuing the above example, this may include querying (456) for topic related insights (e.g., "what did response data indicate about pets?"), demographic related insights (460) (e.g., "what did response data indicate about respondents that live in major cities"), sentiment related insights (464) (e.g., "which topics that were discussed in qualitative response data were most positive, and most negative"), or sentiment conflict related insights (e.g., "where does quantitative response data deviate from qualitative response data"). Results of such queries may be received (470) as result sets, objects, or other data sets or collections that describe the related top level insights, and may include for example, quantitative responses, portions of qualitative responses (e.g., data representative of a qualitative response, or usable to identify or access a qualitative response), other related inputs (e.g., session context input or sensor input), and any analysis (e.g., results of image, audio, transcript, or sentiment analysis) that relates to the top level insights.

As further example, the received (470) result in response to "what did response data indicate about pets" might identify portions of transcripts where respondents talked about topics related to pets, or might identify audio, video, or images captured while respondents talked about topics related to pets, and sentiment determinations related to a respondents discussion on pets. The server (200) may also determine portions of any associated (472) qualitative response data that is related to the top level insight result set, which may include retrieving, accessing, providing access, or otherwise preparing for presentation audio, video, or still images related to the top level insights.

Figure 8:
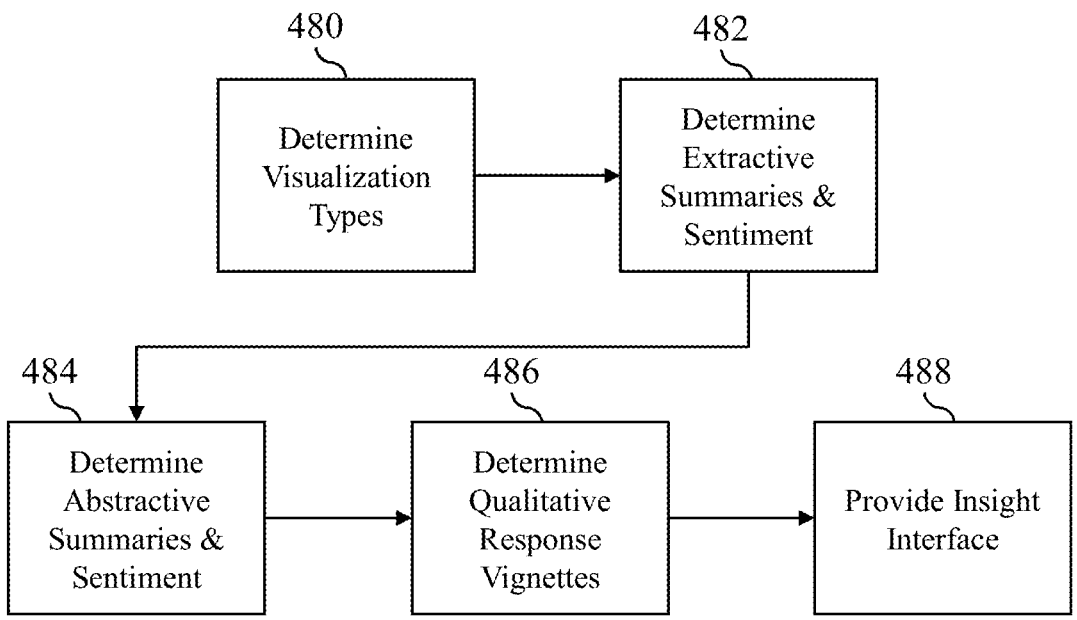
FIG. 8 is a flowchart of an exemplary set of steps that may be performed to provide an insight interface for viewing insights.

FIG. 8 is a flowchart of an exemplary set of steps that may be performed to provide an insight interface for viewing insights. Based upon one or more pre-configured insights (106), the server (200) may determine (480) one or more visualization types appropriate for displaying or providing the insights to a user. Visualization types may be globally configured, or may be configured on a per-survey basis, and may include graphics, charts, word clouds, dendrograms, radial dendrograms, or other diagrams.

Further examples and aspects of visualizations include a radial dendrogram that shows hierarchical data. When finding answers using natural language processing, the responses often use distinct words that have similar meanings. Being able to cluster distinct responses semantically helps reduce the noise in the data and gives more concise results. Concise results can sometimes hide important information, so being able to change from a coarse-grained, concise set of answers to the fine-grain set of actual responses is helpful. This can be done in an interactive way by using visualizations that transition between coarse and fine-grained results. At each level, the user can also find the specific clips where the respondents stated their answers or generate a montage video of all the answers within that cluster. The visualization also allows for the selection of a set of videos based on the answers for further analysis. For example, the user could select all the respondents who stated their favorite thing is their cat and then display the answers to a follow-up question of why their cat is their favorite. The ability to change the level of detail in the synthesis results, query the original video clip that produced the specific result, and subgroup data based on the synthesis results for further analysis using the visualization is a powerful tool for exploring large datasets.

Returning to FIG. 8, the server (200) may also determine (482) one or more extractive summaries of response data, including extractive summaries organized by sentiment, and may also determine (484) one or more abstract summarized, including abstractive summaries organized by sentiment. Extractive summaries with neutral sentiment may be selected from transcript response data based upon being closely related to a top level insight, such as sections of a transcript where analysis indicates the respondent is talking about "pet." Extractive summaries with positive or negative sentiment may be selected based purely on sentiment, such as transcript text where the respondent's qualitative response data was negative or positive, or may be combined with other insights, such as sections where the respondent is talking about "pet" with positive or negative sentiment. Abstractive summaries may be determined (484) similarly to extractive summaries, but may include abstracted response data produced from multiple respondent's qualitative response data, such as abstracted or aggregate forms describing the average, or most common neutral, negative, or positive sentiment response data related to a topic such as "pet." The determined (482, 484) summaries may also include a summary of the most positive, and most negative sentences contained across the response data. Table 2 below provides an example of various summaries, while Table 3 below provides an example of sentences with the most positive sentiment, and sentences with the most negative sentiment being further extracted from the summaries.

TABLE 2

| | Sample extractive and abstractive summaries discussing "shoe" |
|---|---|
| Extractive summary | the only thing that's missing is probably. that thing around the ankle looks like it could support goes whether it would stay tight like a tide shoe or not. what part did it looks super light and super cheap. but almost seems like it would get dinged dirty and what part are you like least? and then the cage I think It looks just a the only thing that i like the least about it is sometimes a chunky bottom can |
| Abstractive summary | it looks like really form-fitting really sleek. all the white around it the primary benefits of the product would be that it's very fashion-forward overall my first impression was really good. it just looks really aerodynamic. and the material just looks very form-fitting and yeah bright and comfortable. the benefits of this product are that it can be multi-purpose and really comfortable the product is definitely designed for modern kind of Jen's ears or you know |
| Abstractive summary with positive sentiment | 'it looks like it would be kind this looks like the type of shoe the shoe looks like some of the overall looks like it seems to check this shoe definitely looks like a it looks like a very big shoe looks like it was built for shoes designed for people who runs pretty the primary benefit of this product is overall i liked the shoe. first impression of this shoe is actually the benefits of this product are that the primary benefits of this shoe would shoe looks similar to other shoes that' |
| Extractive summary with positive sentiment | I think the primary benefits of those I would guess have to do with like the the level of cushioning comfort that it provides which I'd be really interested in trying out because it looks it looks a little bit more built than any shoe I have worn and it kind of looks like a way more upscale version of those which I love that because they are probably the comfiest shoes I've ever worn for like walking around and the only thing that I think that felt like it was missing Very fashion forward on the colors are really vibrant and bright which I like and also makes it very attention-grabbing. |
| Abstractive summary with negative sentiment | "there really doesn't feel like there's anything missing with his shoe. there are no laces the part that i like the most is that there zipper function because when i run it it can be very annoying to have to constantly constantly tie my shoes and velcro. there's no shoe color is missing just to add some extra contouring some lines. i know that there aren't laces which is usually would be missing from his shoe" |

TABLE 2-continued

Sample extractive and abstractive summaries discussing "shoe"

| | |
|---|---|
| Extractive summary with negative sentiment | "feet I would say there's something that this shoe specifically reminds me of it just kind of looks like a more futuristic running shoe to me, but it doesn't like Remind me directly of something else. You know white shoe body with the stripes and then the material is kind of similar to anything that feels missing. doesn't really look like a shoe I've seen before Is there anything I feel says missing and why I'm for me shoelaces." |

TABLE 3

Sentences with maximal positive and negative sentiment

| | |
|---|---|
| Most positive sentences | It looks like it has a great fit on the back of your heel which is super important to me as a runner |
| | My first impression is that this looks like a shoe that was built for comfort and speed and it looks like it would definitely like provide me with like a lot of cushion |
| | so I feel like it does look similar to like other shoes that have been made like maybe even like the bottom because it's rugged like New Balance or something, but I think like overall like this shoe looks like it is like new obviously, so |
| | and I think that's going to be the primary benefit of it like being comfortable like flexible, but also like giving you a lot of support that's why you need like for running. |
| | I like the double foam cushion in the heel most of all as well as the phone that mesh part by the toes and the heels, but definitely like the heel support in the foam like the double cushion on the soul is my favorite part. |
| Most negative sentences | So I don't think that this is a hundred Not beneficial I can see it actually hurting I've had issues with cushions really hurt me on |
| | I don't like this lip color just because I worried that I would scuff it up and it would look bad. |
| | I think in terms of a shape from a different brand and they've been killing my achilles because sometimes I don't wear like socks are long enough. |
| | and oh my goodness my few kill me next day just so much pain. |
| | So if you keep moving around it would probably lose in itself and be hard to adjust constantly throughout the day which would be kind of annoying. |

Figures 13A, 13B:
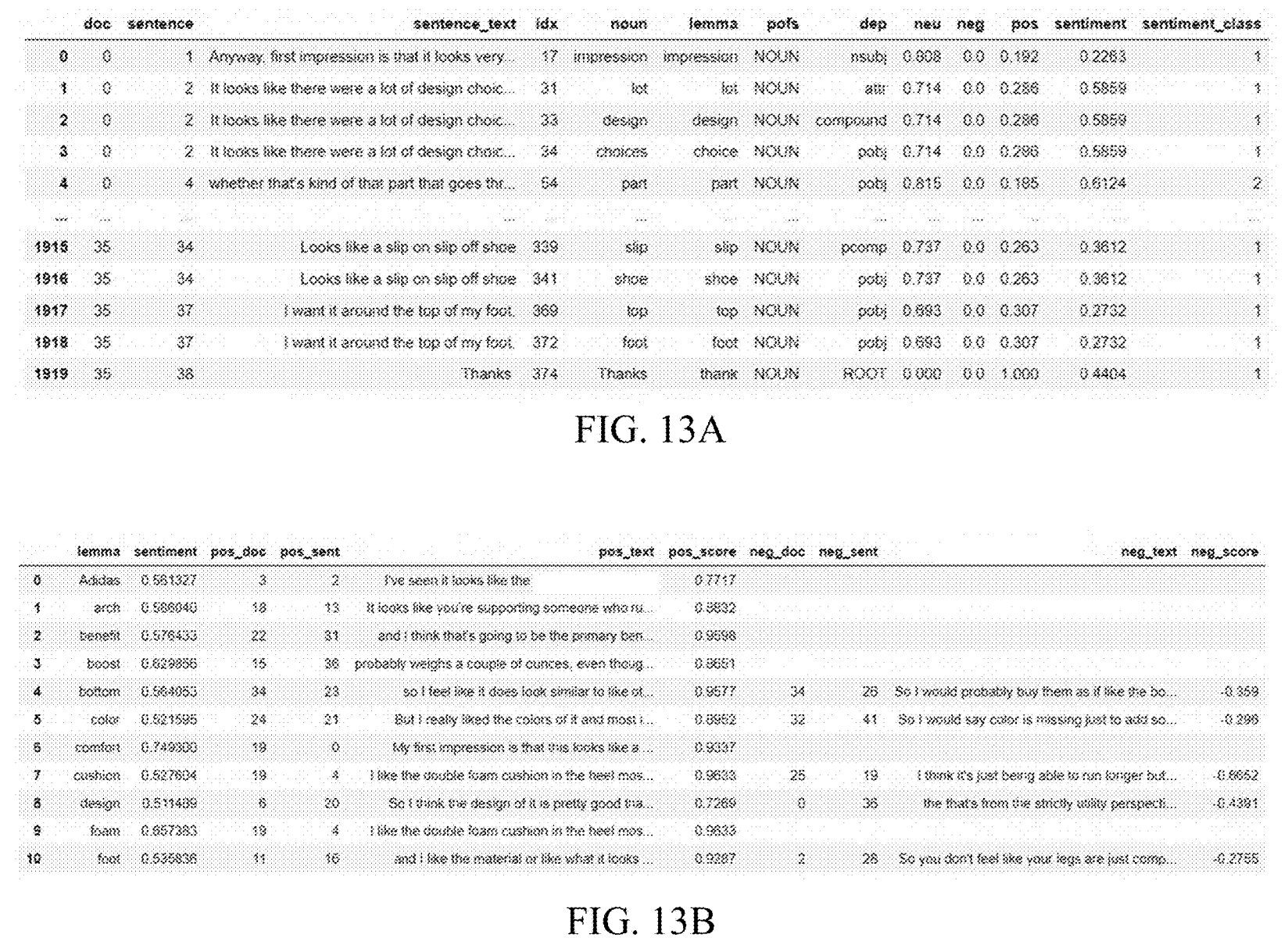
Figure 13E:
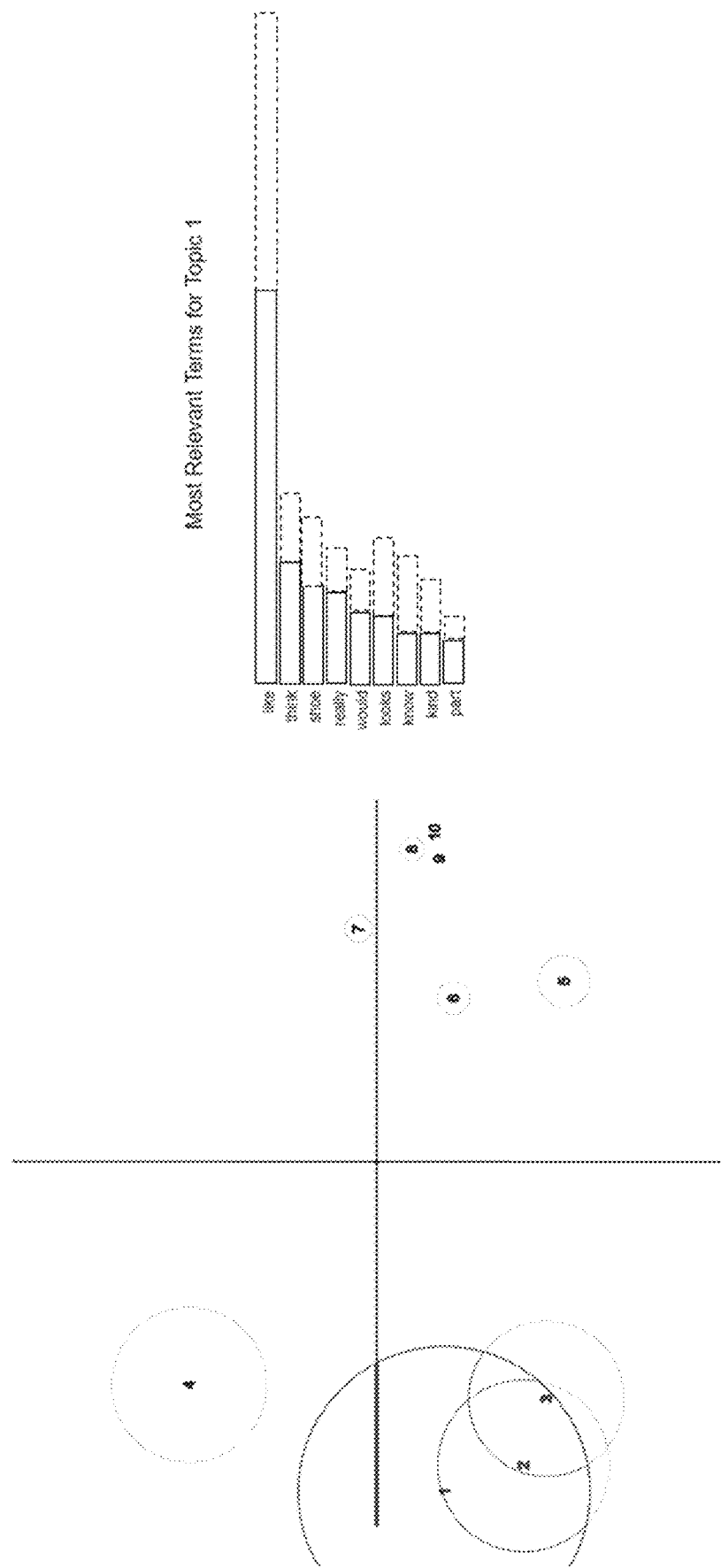
Figure 13F:
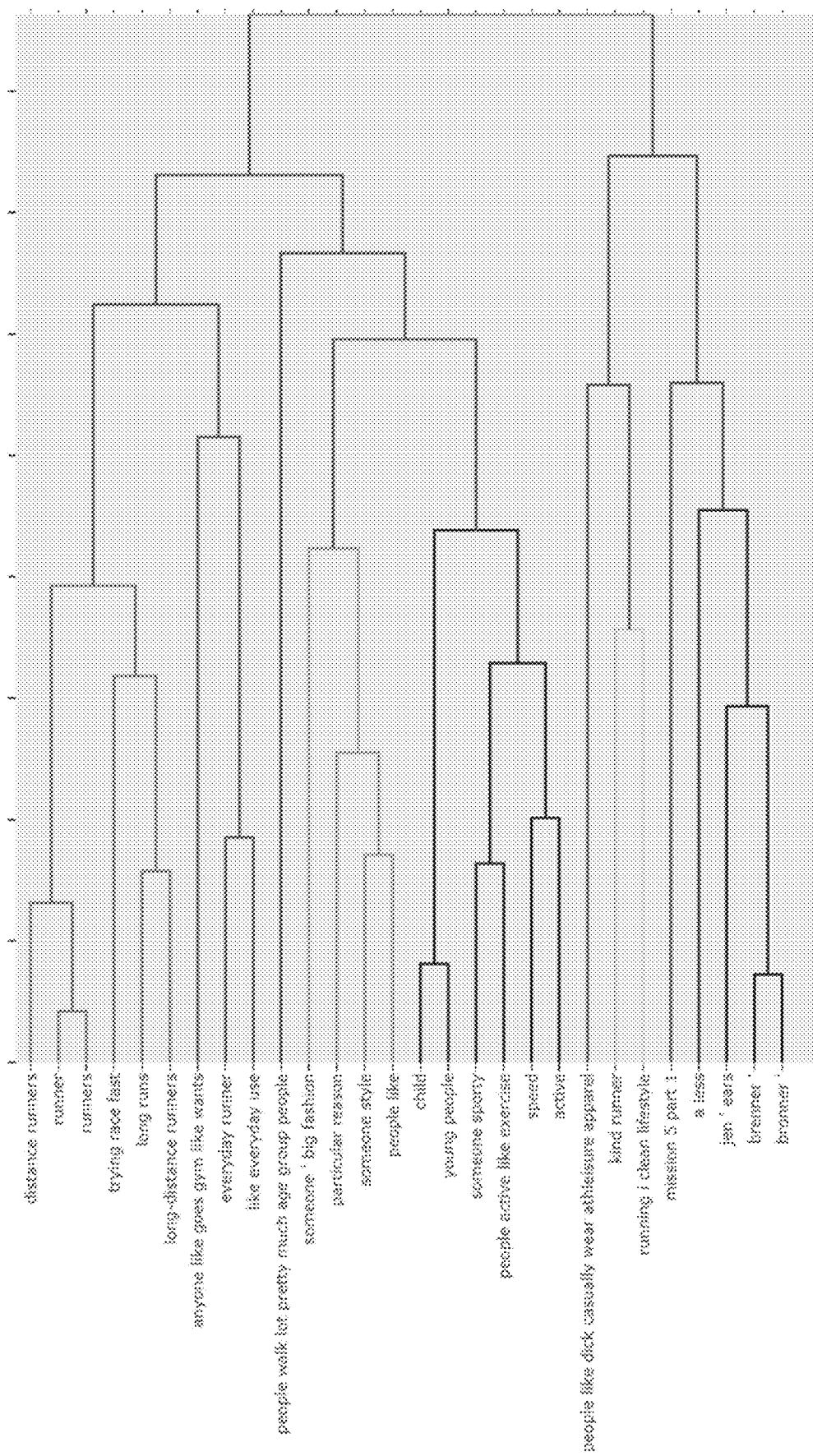

The server (200) may also determine (486) one or more qualitative response vignettes by identifying sections of audio or video qualitative response data that are related to insights, such as identified by the associated (472) qualitative response data, and may select these vignettes as separate portions of qualitative response data (e.g., multiple separate short video clips), or combine them together into a single portion of qualitative response data (e.g., an aggregate video clip containing multiple short video clips). The server (200) may then provide (488) an insight interface to a user that describes determined insights, and that may also include visualizations (480) of insights, summaries (482, 484) of insights, and qualitative response vignettes (486) or samples. FIGS. 13A-13F each show examples of interfaces that may be provided (488) to a user to present response data and insights. FIG. 13A shows sentiment for frequently used nouns, FIG. 13B shows average sentiment of frequently used nouns, FIG. 13C shows term or topic frequency by gender, FIG. 13D shows response data provided as a response to the question "What's your first impression of the shoe?", FIG. 13E shows an inter-topic distance map, and FIG. 13F shows a dendrogram of responses to the questions "Who is this shoe designed for?"

Other features of the insight interface may include automatic highlighting and presentation of transcript text based upon configured keywords, or based upon a user's past use of a manual highlighting tool (e.g., the user always highlights sentences that contain a variation of "love"), or based upon top level insight determinations and/or follow up questions (e.g., a configured top level insight related to the topic "shoe" may cause each sentence that contains that word to be highlighted). Portions of qualitative response data that are manually reviewed via the insight interface, such as by viewing a vignette, reviewing a highlighted transcript, or by asking a follow up question such as "show me all transcript data related to the top level insight "Pets", may be marked within the interface as having been manually reviewed in order to further reduce the time spent on manual review by preventing duplicate review of the already filtered qualitative response data.

Figure 9:
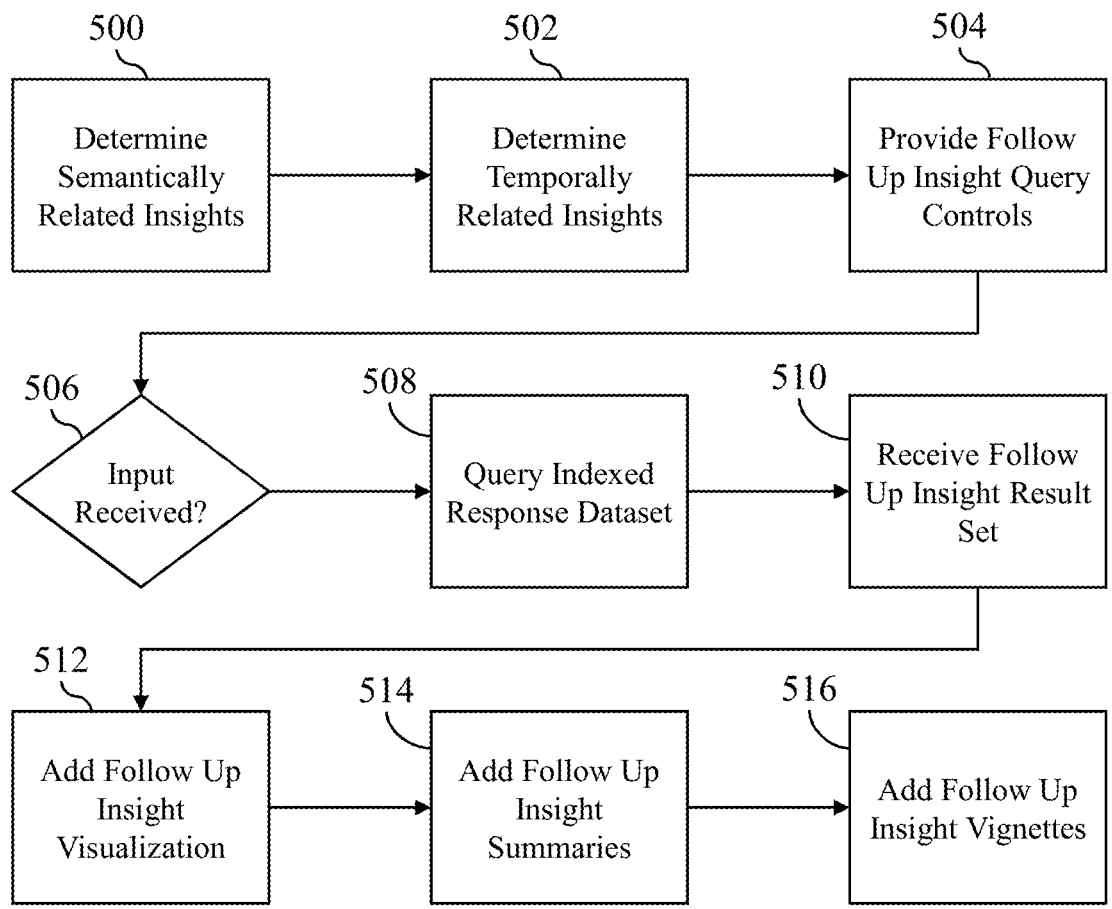
FIG. 9 is a flowchart of an exemplary set of steps that may be performed to provide conversational querying for insights.

FIG. 9 is a flowchart of an exemplary set of steps that may be performed to provide conversational querying for insights. As has been described, some implementations of an insight interface may provide top level insights, as well as a conversational query feature or interface that allows for additional queries to be made against the indexed response dataset using the top level insights as a guide. When providing the conversational query interface, the server (200) may determine additional insights (e.g., related topics, different topics with related sentiment, etc.) that are related to the top level insights. This may include determining (500) semantically related insights (e.g., portions of response data that are related by language, such as shoe, lace, and sole, or shoe, boot, and sandal), or determining (502) temporally related insights (e.g., portions of response data that are related in time to top level insights, such as words or terms used immediately before or after a word identified as a top level insight). The server may provide (504) interface controls via the insight interface that allow for additional information, or different information to be retrieved from the indexed response dataset based upon a user's selection of one or more of the related (500, 502) insights.

When a conversational query is received (506), the server (200) may query (508) the indexed response dataset and receive (510) a follow up insight result set, which may contain additional or different response data and insights than the initial top level insight result set. The insight interface may then be updated to add (512) additional visualizations based on the follow up question, to add (514) additional insight summaries based on the follow up question, and to add (516) additional qualitative response vignettes based on the follow up question. In some implementations the additional (512, 514, 516) insight data may be presented instead of previously displayed data (e.g., a new page may load), while in some implementations such additional insight may be added or built into the already displayed insight interface.

Figure 11A:
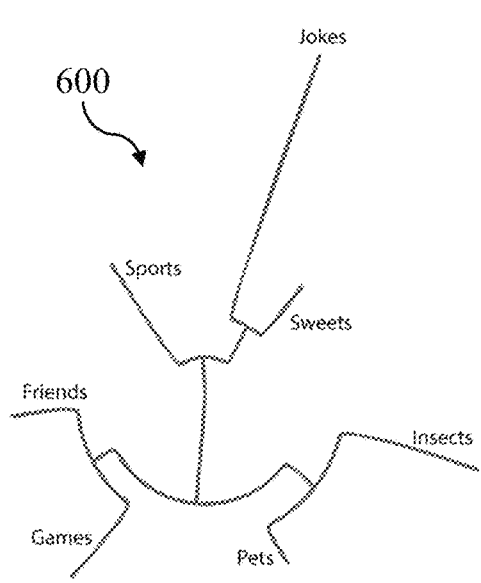
FIG. 11A is a schematic diagram illustrating an exemplary visualization of top level insights.
Figure 11B:
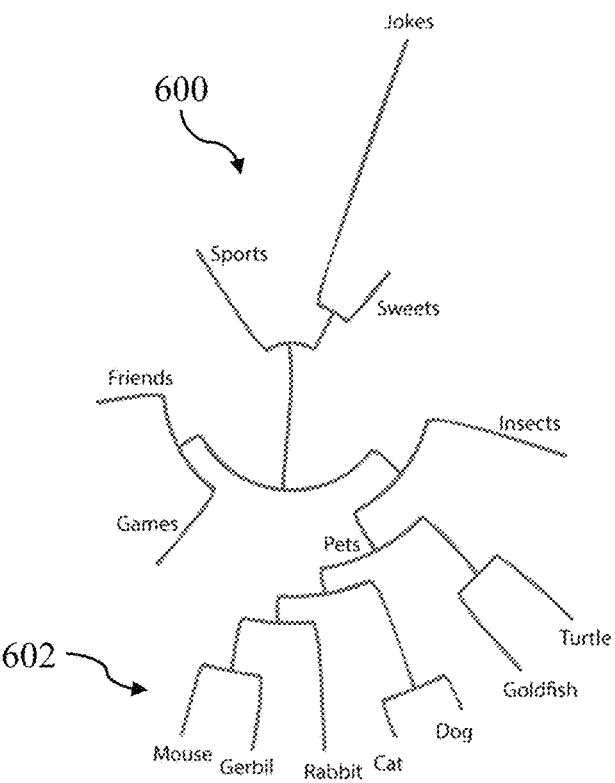
FIG. 11B is a schematic diagram of the visualization of FIG. 11A with an expanded top level insight.
Figure 11C:
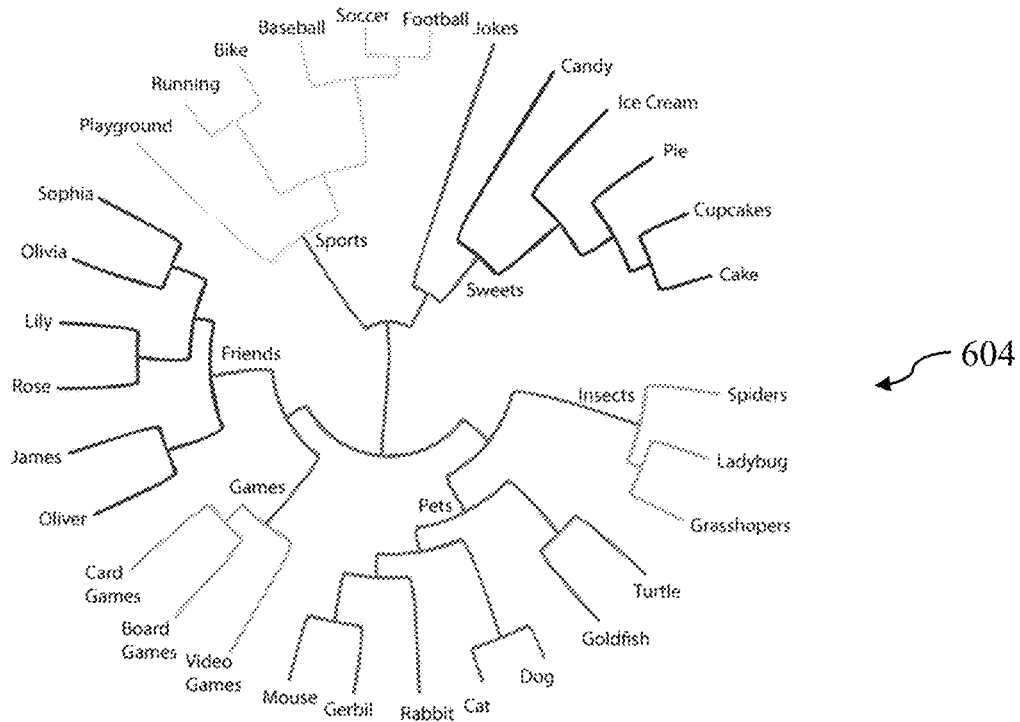
FIG. 11C is a schematic diagram of the visualization of FIG. 11A with multiple expanded top level insights.

As an example, FIGS. 11A-11C and 12A-12C each show examples of visualizations and interfaces that may be displayed by the insight interface during conversational querying of the indexed response dataset. FIG. 11A shows a radial dendrogram (600) of the most commonly discussed topics within qualitative response data for a particular question, and may be analogous to top-level insights (e.g., most common nouns associated with positive sentiment, most common nouns associated with negatives sentiment, etc.). FIG. 11B shows the dendrogram (600) with an expanded branch (602) extending from the "pets" branch of top-level insights, while FIG. 11C shows the dendrogram (604) from FIG. 11A with a fully expanded set of second level insights, each expanding from a top-level insight. As can be seen, a determination of top level insights might report that respondents commonly discussed "pets" with both positive and negative sentiment, while a follow up question based up on that top level insight might provide the further information that the most frequently discussed topics semantically related to pets include mouse, gerbil, rabbit, cat, dog, goldfish, and turtle.

Figure 12A:
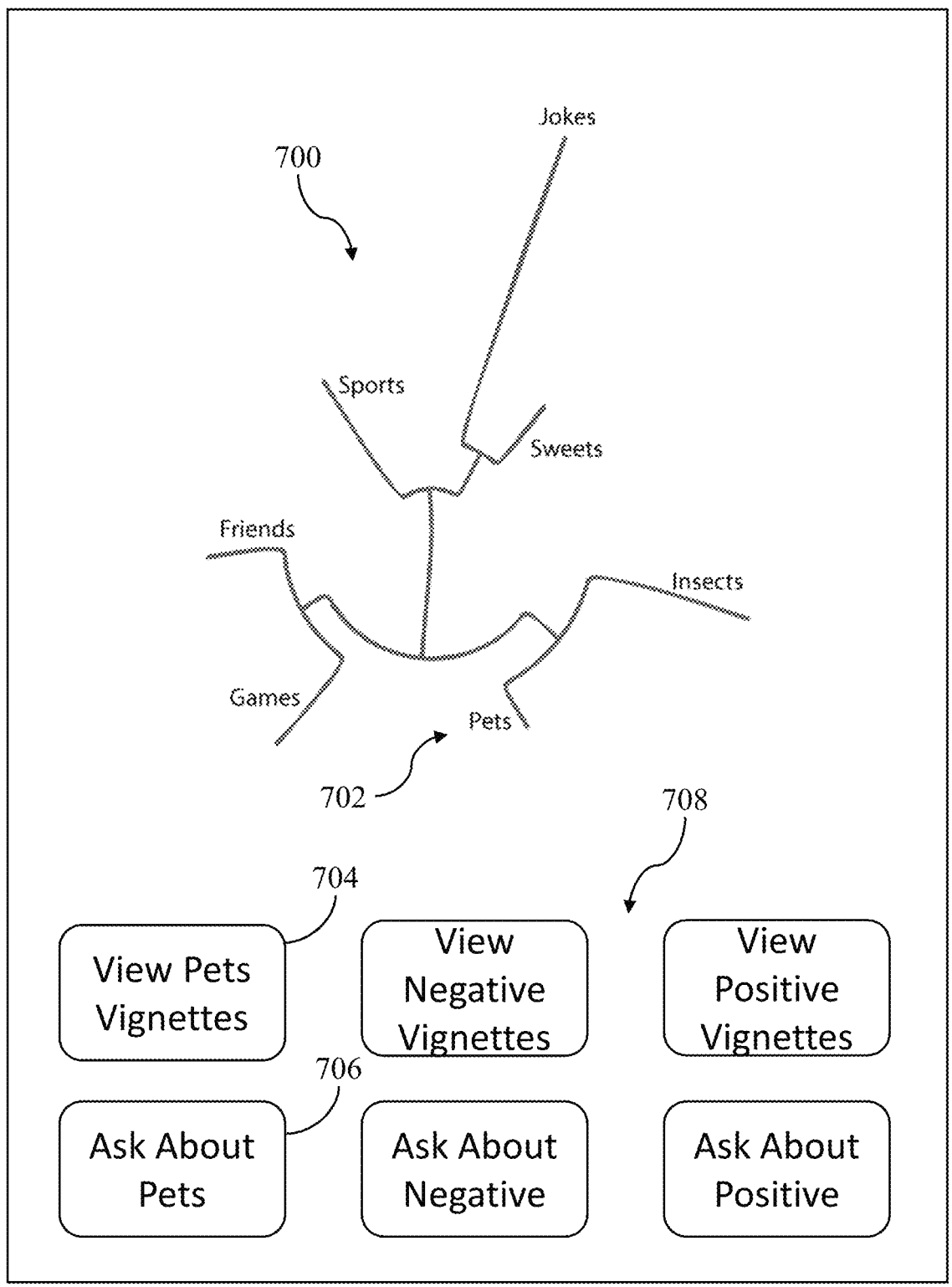
FIG. 12A is a screenshot of an exemplary insight interface at a first state.
Figure 12B:
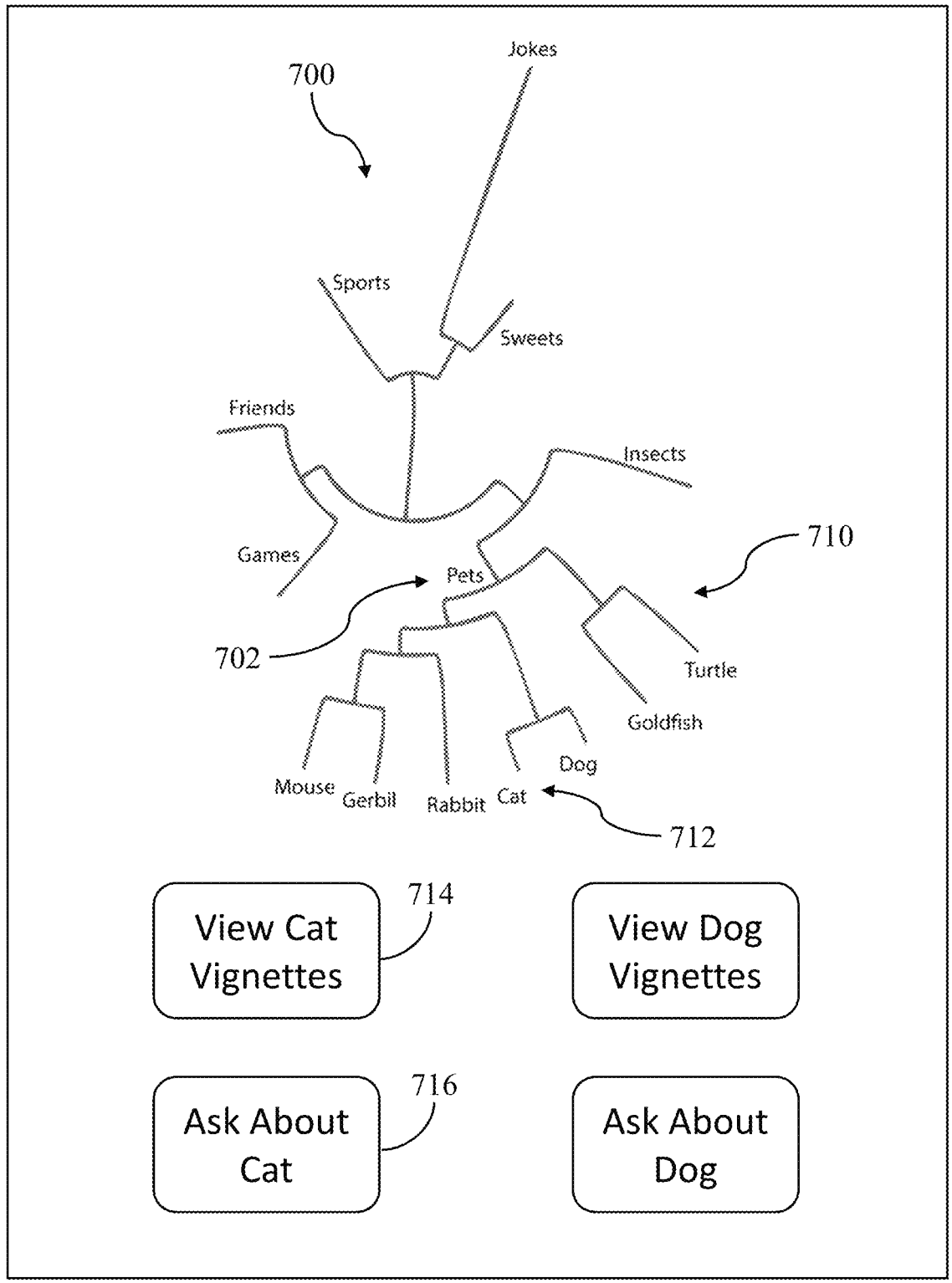
FIG. 12B is a screenshot of an exemplary insight interface at a second state.
Figure 12C:
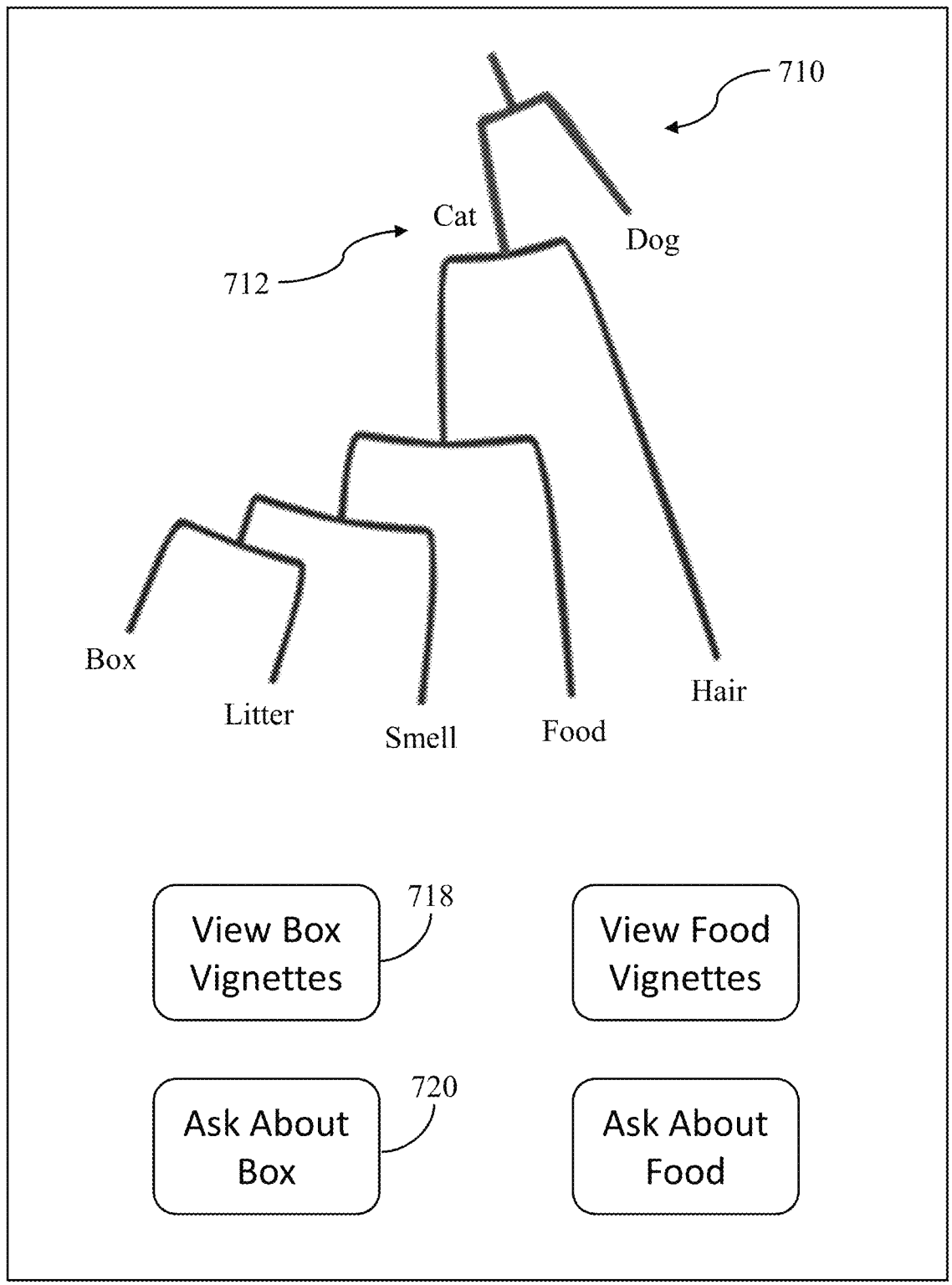
FIG. 12C is a screenshot of an exemplary insight interface at a third state.

FIGS. 12A-12C show examples of interfaces that may be displayed during conversational querying of a data structure or visualization such as the dendrogram (600). In FIG. 12A, a visualization (700) may initially be displayed to a user via the insight interface to display top level insights drawn from an indexed response dataset (e.g., based upon a pre-configured query for top level insights). The interface may be provided with additional conversational query controls, or other controls. As an example, one button (704) that a user may interact with may cause one or more audio, video, or other qualitative response data samples related to "pet" to be presented via the interface. Another button (706) may trigger a conversational query for additional topics related to "pet". Other buttons (708) may also be provided for different types of vignettes to be selected and presented, such as those including the most negative sentiment, or those including the most positive sentiment, or may allow for conversational queries to be submitted to identify additional negative or positive topics or insights.

While controls for vignette viewing may be provided based upon top level insights or configured topics of interest, as has been described, the interface may also allow for more free form vignette selection, compilation, and viewing based upon the indexed response dataset. For example, a user may query the indexed response dataset (e.g., by constructing a plaintext query, or by interacting with a query builder tool or interface) to see vignettes of video clips that meet criteria such as "positive sentiment about Object A", "negative sentiment about Object B", "respondent wearing red clothing", "respondent's that discussed sustainability", and other queries. A query builder interface that provides query options based upon the indexed response dataset may be advantageous for such free form queries, as it may provide a selection that allows a user to view a vignette of respondent's wearing red only when the indexed response data actually contains image analysis suggesting that some significant number of respondent's wore red (e.g., the interface may prevent a query for vignettes of "respondent wearing green clothing" where no respondent wore green clothing while recording qualitative video response data).

FIG. 12B shows a second state of the visualization (700) that may result from a user clicking the button (706), or by clicking directly on the "Pets" text in the visualization (700), for example. As can be seen, the results of the conversational query (710) asking about common topics related to "pet" that are contained in the indexed response dataset have been appended to the "Pets" branch (702) of the visualization (700). A user of the insight interface may be interested in "Cat", perhaps because they offer goods or services related to cats, and so may select a button (714) to view one or more vignettes related to cats, or may select another button (716) to submit a further conversational query about cats.

FIG. 12C shows a third state of the visualization (700) that includes the results of the conversational query executed by clicking the button (716) to further ask about cats. Where the user of the insight interface is interested in negative sentiment related to cats, the initial visualization (700) may have been focused on negative sentiment, and so the expanded visualization of FIG. 12C may illustrate, after several conversational queries, examples of negative sentiment topics related to cats (e.g., box, litter, smell, food, hair).

As with prior examples, the user may select a button (718) to view qualitative response vignettes related to "box" or another topic, or may select another button (720) to ask additional, conversational follow up questions about box, or another topic.

At each state of the interface (e.g., illustrated in FIGS. 12A-12C), it can be seen that the conversational query provides additional information (e.g., new topics are introduced as sub-topics of a parent topic), while also providing a different set of vignettes or other related information, which may be more relevant to the user's actual interest. For example, viewing vignettes related to Pets by clicking the button (704) in FIG. 12A may provide a large amount of qualitative video data relating to many different types of pets. Clicking the button (714) in FIG. 12B may provide a reduced amount of qualitative video data, relating only or primarily to Cats instead of Pets more generally. Clicking the button (718) of FIG. 12C may provide an even further reduced amount of qualitative video data, relating only or primarily to Cat Boxes, instead of to cats more generally. The above example illustrates the advantage of conversational insight querying, and how it enables a large amount of qualitative data (e.g., video, audio, or other) to be statically stored, without manual review, and dynamically queried to simulate an ongoing conversation with respondents.

Other advantages and features of conversational querying or analysis exist. For example, a common component of surveys is asking open-ended questions that allow the respondent to reply in an unstructured way. While this survey approach can provide more detailed information when compared with multiple choice or quantitative questions, it requires more effort to extract meaningful insights, and is often not feasible using manual review. The conversational analysis approach allows the user to interrogate a set of videos using either the questions in the original video survey or other useful questions derived when analyzing the videos.

With this approach, users can interrogate a set of videos by asking questions after the creation of the video survey response data. The framework provides users the groupings of semantically-similar answers along with measures of the quality of the analysis and the video and timestamp of each answer. A user may select a pre-processed set of videos and provide one or more questions to be answered. The conversational analysis service then determines the best answers to the questions within each video as well as measures of how accurately it believes it found the answers. The answers are then clustered together in a semantically-similar manner where different words and phrases with similar meanings are grouped together. This reduces the amount of unique answers and provides a more human-like result. The clusters can then be examined more closely to obtain the exact answers spoken in the video. The clustering can also be used to generate a vignette of video clips that provide the user with the person in the video speaking their answer to the given question. The resulting answer data features are stored for future analysis. For example, the sentences containing the answer for a question from each video can be combined with quantitative or demographic data, summarized, or analyzed for sentiment.

Figure 10:
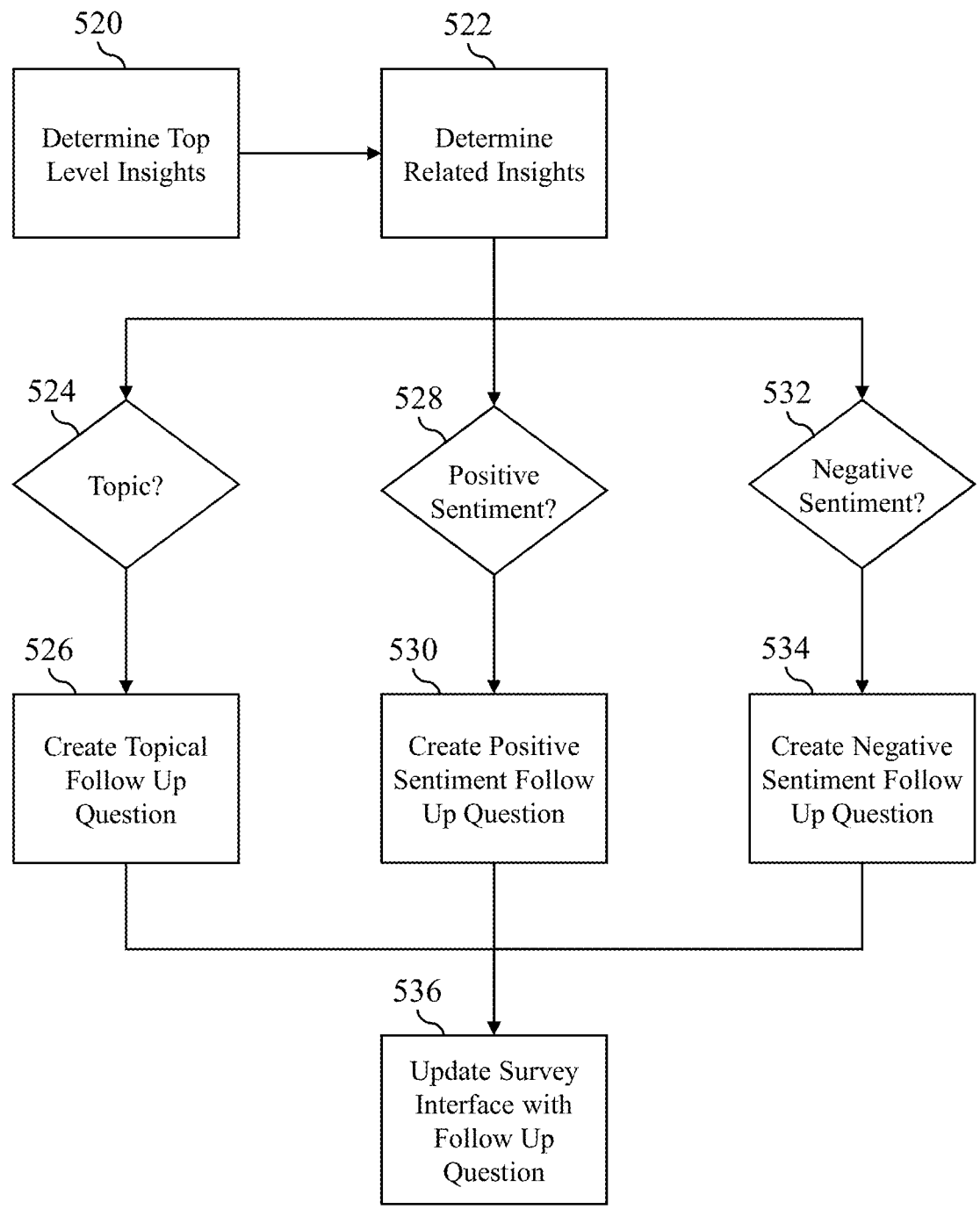
FIG. 10 is a flowchart of an exemplary set of steps that may be performed to provide real-time follow up questioning.

FIG. 10 is a flowchart of an exemplary set of steps that may be performed to provide real-time follow up questioning. In some implementations, the server (200) may be configured to provide real time follow up questioning while a survey respondent is completing a survey, based upon partial response data from the survey. Real time follow up questioning may function similarly to conversational querying, in that it may be based upon a second query that is prompted by determined top level insights. However, rather than querying the static response data for additional insights, the survey interface may instead be updated in real time to reflect the additional quantitative and/or qualitative response prompt. As has been described, such real time questioning may be based upon determining (520) one or more top level insights from within at least a partial set of previously received (102) and analyzed (104) response data.

After determining (520) a first set of top level insights, the server (200) may determine (522) one or more closely related topics that may be asked about based upon a pre-configured set of follow up queries (e.g., "ask about the most commonly used noun", "ask about cats if that is a commonly used noun", "ask about the noun associated with the most positive sentiment"). As an example with reference to FIG. 11A, suppose that the dendrogram represents topics that have been identified (520) as, for a particular respondent, the nouns most frequently used in response to a qualitative prompt such as "Record a 3-5 minute long video about things that make you happy during summer." In determining (522) potentially related insights to ask about in real time, the server (200) may have been configured to ask about cats if a topic (524) related to cats is discussed (e.g., Pet), or to ask about the noun with the most positive sentiment (528) (e.g., Friends), or to ask about the noun with the most negative sentiment (532) (e.g., Insects).

Where a configured follow up question exists and can be automatically determined while the respondent is still engaged with the survey interface, the server (200) may automatically generate a corresponding follow up question and update (536) the survey to include the new quantitative and/or qualitative prompt. Continuing the above example, the server (200) may identify a topical (524) follow up question due to the discussion of Pets identified in the top level insights, and may create (526) a topical follow up question set such as "Rate how happy cats make you between 1 and 10, and then record a short video letting us know what you think about cats." The server (200) may also identify a positive sentiment (528) related follow up question due to the high positive sentiment associated with "Friends", and may create (530) a positive sentiment follow up question set such as "We get the feeling that friends make you happy, let us know with a 'Yes' or 'No' whether you plan to spend time with friends in the next ten days, and record a short video about your plans." The server (200) may also identify a negative sentiment (532) related follow up question due to the high negative sentiment associated with "Insects", and may create (534) a negative sentiment follow up question set such as "We see that you like summer, but that you're not a big fan of insects. Let us know on a scale of 1 to 5 how likely insects are to affect your summer plans, and record a short video explaining why."

As each follow up question is created (526, 530, 534), the server (200) may update (536) the survey interface to reflect the new quantitative and/or qualitative question prompts, ideally while the respondent is still engaged with a prior prompt or other aspect of the survey interface. Updating (536) the survey interface will depend upon a particular implantation and platform, but may include, for example, appending additional sections onto an HTML page or within a software application interface, or providing a button to proceed to a next page of the survey instead of a button used to complete or submit the survey via an interface. In some implementations, the update (536) to the survey interface will be performed seamlessly, such that the follow up question may be asked in near real time based upon already provided response data, such that the respondent is still engaged with the survey interface, and their previously provided response data is still fresh in their mind.

As further example of real time conversational surveys, conversational video surveys can be tailored to the aspects of the respondent's partial response data. This is possible by leveraging the multiple data sources that video provides (image, audio, and text), which can be analyzed in parallel to provide varying data characteristics. In this manner, partial response data received from the respondent may be interpreted to adapt or add survey questions automatically. Some examples that would be unique to this approach include responding, with new or different questions, to keywords or phrases spoken by the respondent and identified through NLP, using cues from facial emotions (e.g., from image or video analysis), voice emotion (e.g., from audio analysis), and text sentiment to identify concerns that were not known beforehand to create immediate, same session, follow up questions, identifying objects in the video (e.g., by image analysis) and providing immediate questions concerning those objects (e.g., if an apparel brand is detected from a logo the respondent could receive a question relevant to that brand), or suggesting the use of other features, such as augmented reality, based on cues from the respondent (e.g., where a transcript indicates the user is curious what a shoe would look like when worn, the system may suggest using augmented reality to simulate that scenario and provide a button or other interface to activate the augmented reality view).

In some implementations, an insight interface may allow users to perform conversational queries against response data with various time-based search limitations. For example, where the indexed response dataset includes responses from surveys that have been provided to a common respondent group multiple times (e.g., once per month), the dataset may be conversationally queried at its most general level, which would treat all response data as "timeless", in other words, response data from a single respondent that has been collected once per month over a six month period would be treated as an aggregate rather than separate instances of response data.

In the above instance, conversational queries could also be given time parameters to limit the response data that is queried in varying ways, where the user does not wish the response data to be treated as an aggregate. An example of a time parameter may be to query the response data based upon its age, which would provide insights based upon historic snapshots of the response data. For example, this could include a query for information such as "positive sentiment for pets one month ago" or "positive sentiment for pets six months ago". Such a query could filter the indexed response dataset to only portions that are based on response data that was received one month ago, or six months ago, respectively. Another example of a time parameter is to query the response data based upon a respondent's relative "age" within the response data, rather than the strict age of the data. As an example, imagine a first respondent who has responded to surveys related to a particular cat food once per month over a period of six months, and a second respondent who has responded to surveys related to the particular cat food once per month over a period of three months. A query based on a relative "age" of three months would query the indexed response dataset based upon a respondents third month of response data, regardless of when the response occurred. The resulting dataset would describe insights for any respondent that had spent three months with the particular cat food, regardless of when those three months occurred.

Figure 14:
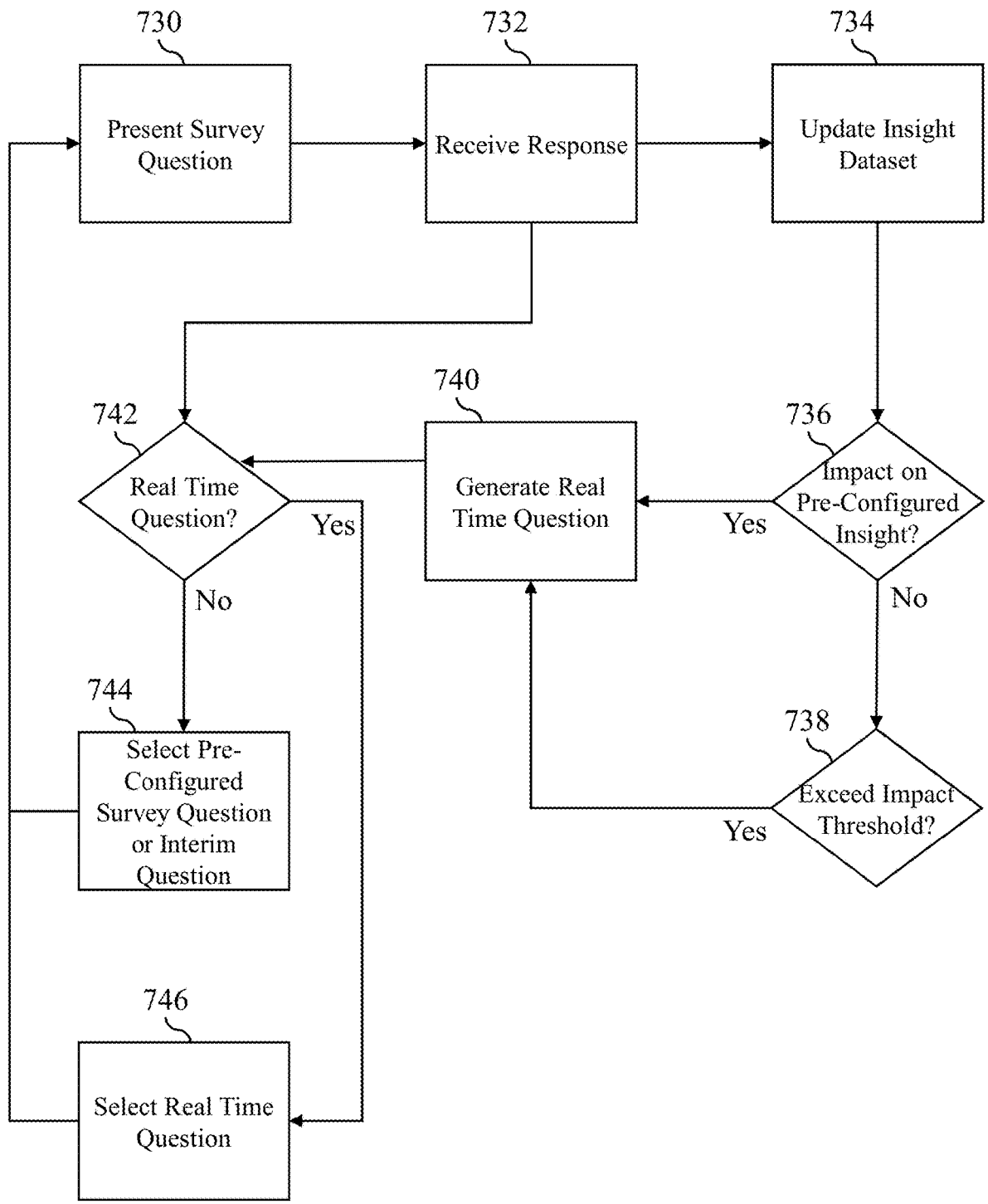
FIG. 14 is a flowchart of an exemplary set of steps that may be performed to provide real-time follow up questioning.

While the discussion of FIG. 10 provides some examples of the disclosed technology's capability to pose dynamic additional questions in real-time, before the survey respondent has completed a survey, other examples exist and are apparent to those of ordinary skill in the art in light of this disclosure. As an example, FIG. 14 is a flowchart of an exemplary set of steps that may be performed to provide real-time follow up questioning. While the example of FIG. 10 provides specific examples focusing on specific topics or specific sentiment, the example of FIG. 14 provides a more generalized approach that focuses on a particular response's impact on one or more pre-configured insights (e.g., topics, sentiments, respondent characteristics, etc.), or a substantial impact on insights that are not pre-configured.

For example, a survey relating to a shoe may not be pre-configured to focus on the shoelaces, but where responses from one or more respondents show positive or negative sentiment that exceeds the general sentiment towards the shoe by more than a configured threshold, it is advantageous to ask a dynamic follow up question in real time, while the respondent is still engaged, in order to explore the unexpected sentiment.

Continuing the above example, a pre-configured question might ask a respondent to rate different aspects of the shoe on a scale of 1-10, and the respondent's input might average out to 5.5, while their score for the shoelaces is a 9 (e.g., the same example could apply to video or audio responses from the respondent, as well as other response mediums, as described in the context of FIG. 6 and elsewhere). Since the rating for the shoelaces exceeds a configured threshold (e.g., +/−2.0 from the average rating), the system may examine insights within a stored insight dataset for "shoelaces" and identify sub-aspects of shoelaces (e.g., similar to the graph shown in FIG. 11C) such as color, texture, length, material, durability, or other sub-aspects. The system may then generate, in real-time while the respondent is still engaged with the survey (e.g., the respondent may have been provided a subsequent pre-configured question if the dynamic questions are not immediately available), one or more dynamic questions based on those identified sub-aspects, or other related insights from the insight dataset, such as a prompt to rate or provide audio/video feedback on the shoelace's color, texture, length, material, and so on.

In some implementations, the system may be configured to provide an additional interim question or prompt designed to occupy the respondent while the system, in parallel, identifies related insights and creates dynamic questions. As an example, this may include, immediately after receiving the respondent's numerical ratings of aspects of the shoe, providing a prompt for the respondent to provide audio or video feedback for 30 seconds, completing creation of the dynamic questions in parallel with the respondent providing the 30 second feedback, and then providing the now prepared dynamic questions immediately after the 30 second feedback is completed. Interactive games, riddles, or other compelling interactions may be provided to the respondent instead of or in addition to audio/video prompts (e.g., such as a clickable logic game or puzzle being displayed along with the message "Thanks for that last answer, we love it! As a reward, try to solve this logic game—only 48% of our respondents are able to complete it!")

Such approaches are advantageous over conventional survey interfaces because they are able to ask follow up questions dynamically while the respondent is still engaged, and are able to maintain the respondent's attention during periods of time required to identify and generate follow up questions in order to maintain the real-time nature of the dynamic questioning even where the time required to generate the questions exceeds the short window in which the respondent expects a new survey interface to be loaded (e.g., such as the 0.5 to 2 second window in which a new web page interface might be loaded).

Steps to perform the above may include presenting (730) a survey question via a survey interface and receiving (732) a response to the question, as has been described above (e.g., a quantitative and/or qualitative response, in one or more mediums such as text, numerical, video, audio, etc.). After receiving (732) the response, the system may update (734) the insight dataset based on the response, and then determine whether the response impacts (736) any pre-configured topics of particular interest (e.g., such as described in the context of FIG. 10), or whether the impact of the response exceeds (738) any other insights by more than a configured threshold (e.g., unexpectedly positive or negative sentiment, unexpected focus within a free-form text, audio, or video feedback, etc.). Where one of the preceding is true, the system may generate (740) additional dynamic questions to be provided in one or more survey interfaces to the respondent. As described above, the generated (740) dynamic questions may be presented as natural language queries, and may be based on the system's existing insight dataset, topic and sub-topic relations (e.g., such as illustrated in FIG. 11C and described above), and other response inputs.

The system may also, after receiving (732) the response and in parallel with performing steps towards generating (740) real time questions, determine that no real time questions are currently prepared (742) and select (744) as the next survey question a pre-configured survey question (e.g., a static question that the survey provider had configured to be asked whether or not dynamic real time questions are generated) or an interim question (e.g., a time-consuming question such as described above, including a 30 second audio or video prompt, a short interactive logic game, a riddle, etc.) designed to occupy the respondent while the real time questions are generated (740). Where the system determines that a real time question is prepared (742), the system may instead select (746) the prepared real time question. In either case, the selected (744) question may then be presented (730) to the respondent via the survey interface, and the steps of FIG. 14 may continue until no questions, whether pre-configured or generated (740) in real time, remain.

Figure 15:
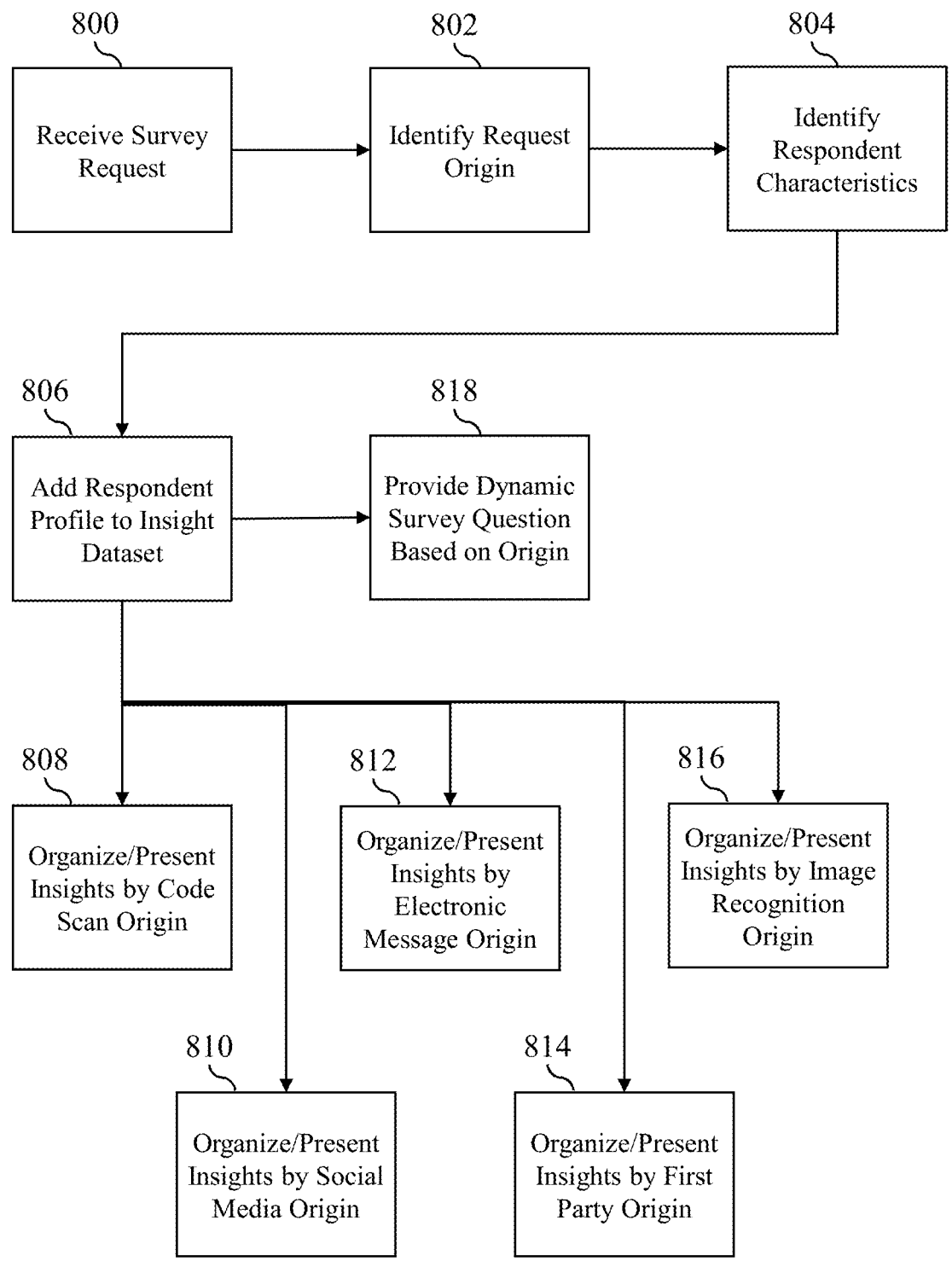
FIG. 15 is a flowchart of an exemplary set of steps that may be performed to track and organize insight data based on the origin of responses.

While FIG. 6 shows and describes a variety of user input types that may be analyzed to build insight datasets as has been described, implementations of the disclosed system may be configured to track and organize additional data related to responses. As an example, FIG. 15 is a flowchart of an exemplary set of steps that may be performed to track and organize insight data based on the origin of responses. Such a feature is advantageous because a respondent's inputs to the survey system may be influenced by, or may be given extra context when analyzed in light of, the point of origin at which they engaged with the survey. As an example, respondents that engage with the survey by clicking a link within an email or text message may have different initial sentiment as compared to respondents that engage with the survey by clicking a link related to a technical support experience or troubleshooting page on a first party website (e.g., a respondent beginning a survey on a product by clicking a link on the manufacturer's troubleshooting page may be focused on providing very negative feedback on the product out of frustration). Implementations of the system may be configured to generate and track the origin of respondents by using custom URLs, parameters, attributes, cookies, or other tracking technologies, and may add that information to the insight dataset so that it may be considered in combination with that respondent's responses.

To perform the above, the system may receive (800) a survey request from a respondent (e.g., clicking on a link that loads in a web site or software application) and may identify (802) the origin of that request (e.g., by querying a database table that relates unique links, parameters, attributes, or other unique information to an origin). The system may identify (804) respondent characteristics based upon the identified (802) origin and/or other information known about the respondent (e.g., such as may be associated with a user account of the respondent, stored in cookies or other tracking technologies associated with the respondent, or otherwise). Identifying (804) respondent characteristics may include determining that the respondent is likely to have a positive or negative sentiment (e.g., users entering the system from a link associated with a troubleshooting or complaint page or process), that the respondent is likely to be an experienced user of the product, or that the respondent has likely never interacted with the product, all based upon their origin.

The system add (806) respondent profile data (e.g., including origin) to the insight dataset, and provide (818) dynamic survey questions in real time based in part on the origin, as described above in the context of FIG. 14. For example, where a respondent's origin is associated with a customer troubleshooting page or process, a dynamically generated question may prompt the user to provide feedback on whether their customer service experiences was positive or negative, in addition to prompting for responses related to product features and use.

When adding (806) the respondent profile to the insight dataset, the system may organize the dataset to relate and present insights specific to that origin or category of origin, which may allow a company to, for example, categorize and view insights and sentiment analysis only for respondents whose origin was an electronic mail or text message, or may view insights and sentiment analysis excluding such respondents.

Origins that may be particularly advantageous to organize and filter/present corresponding insights for include, for example, separately presenting (808) insights where the origin is an optical or wireless code scan (e.g., a product itself, or product packaging, may include a QR code or other optical code, or an RFID tag or other wireless tag, that may be interacted with by a user device to initiate the survey). Respondents originating from such a code scan are known to have the product in-hand, and so their responses may be more highly valued or weighted as compared to other origins, or may be otherwise treated differently.

As another example, it may be advantageous to separately present (810) insights where the origin is a social media website. Responses originating from a social media website may be integrated with insights with a lower weight or at a lower impact, or, in the case of responses originating from a sub-section of a social media website that is dedicated to the topic of the survey, may be integrated at a higher weight or higher impact.

As another example, it may be advantageous to separately present (812) insights where the origin is an electronic mail or text message, separately present (814) insights where the origin is a first-party website associated with the topic (e.g., a manufacturer's website for a product that is the topic of the survey, or to separately present (816) insights where the origin is an image capture and recognition process executed on a user device (e.g., rather than scanning a code to identify the product and origin, an image of the product itself may be uploaded and analyzed to identify the product and initiate a survey).

Figure 16:
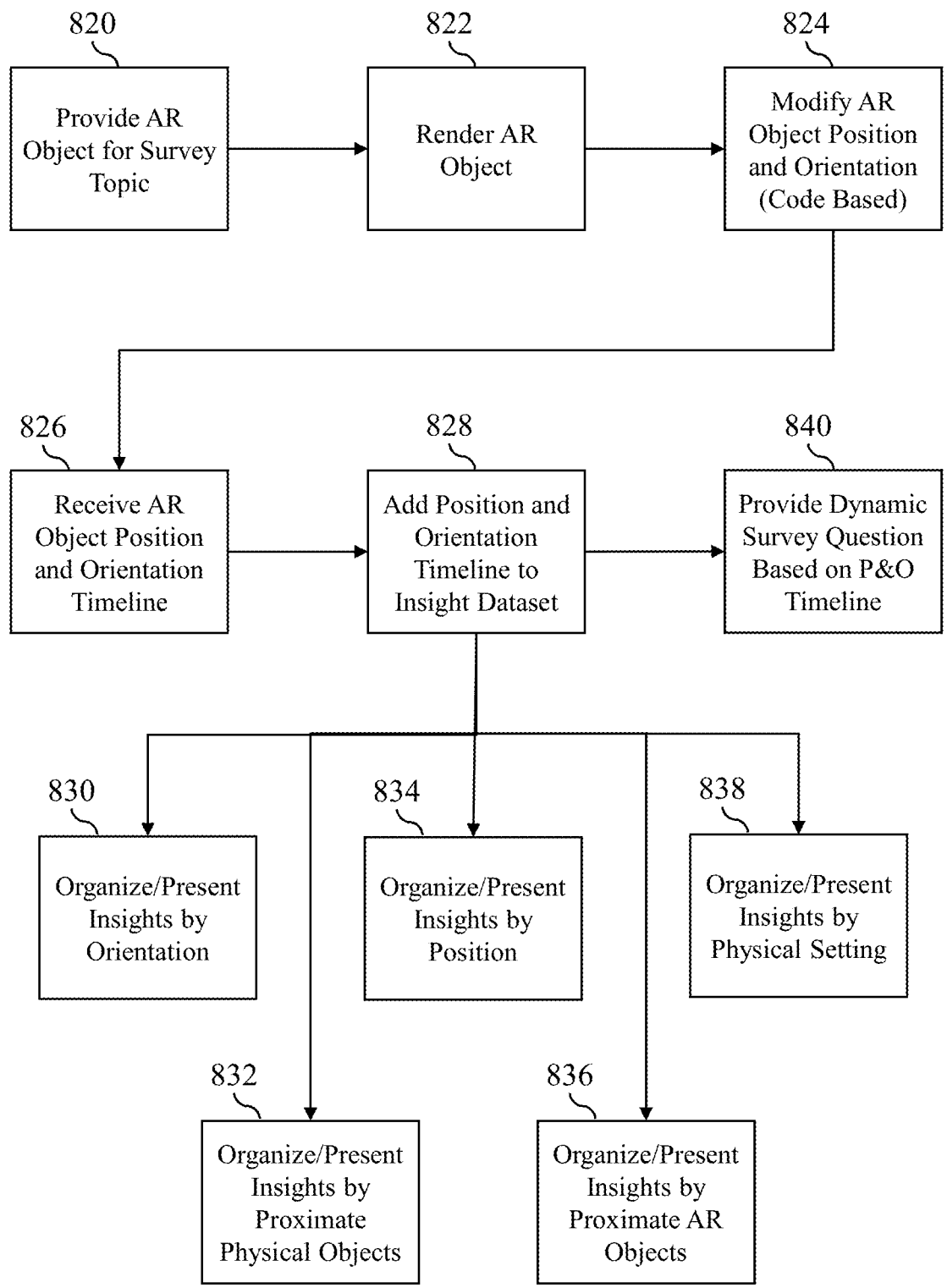
FIG. 16 is a flowchart of an exemplary set of steps that may be performed to provide and track interactions with augmented reality objects during a survey.

As another example of an input type by which a respondent may provide input as part of a mixed medium response (e.g., such as illustrated in FIG. 6), FIG. 16 is a flowchart of an exemplary set of steps that may be performed to provide and track interactions with augmented reality objects during a survey, where the interactions are tracked and added to insight dataset as an additional source of respondent information. A system implementing the above may provide (820) an augmented reality ("AR") object to a respondent via the survey interface. An AR object is digital object that may be positioned and rendered (822) over images or video of a physical setting, and then viewed via a user device. As one example, a user may operate a smartphone to capture images and video of a desktop in front of them, and one or more AR objects may be digitally rendered over the captured images, so that they are viewable via the display of the smartphone. Once rendered (822) via the user device, the respondent may view the AR objects and modify (824) their position and/or orientation, which may be accomplished by, for example, interacting with the object via a touchscreen display on which it is rendered to move, reposition, rotate, or otherwise modify the object's state. In some implementations, a QR code or optical code may be provided to respondent on a physical placard, or printable on a piece of paper, and may be recognized by the smartphone camera and used to modify (824) the position of the AR object (e.g., the AR object may be anchored to the recognized position of the QR code, such that moving the code around the desktop, or rotating the code, will cause a corresponding change in the AR object).

The survey interface (e.g., web location rendered via a browser, or a native software application installed on the user device) is configured to track modifications (824) of the AR object position, and throughout a user's interactions with the AR object the system receives (826) data that populates an AR object position and orientation timeline, which is added (828) to the insight dataset and used as an additional data layer and input source for mixed response analysis. As AR position and orientation timeline data is added and the insight dataset is updated, the system may also provide (840) dynamic survey questions based at least in part on the position and orientation timeline. For example, where a respondent is interacting with an AR object representing a shoe during a survey asking questions related to the shoe, the system may receive and analyze various respondent inputs (e.g., such as shown in FIG. 6) to produce sentiment and other insights as has been described, and may also overlay the position and orientation timeline as an additional data layer for those respondent inputs and insights.

Continuing this example, the respondent may be providing audio and video feedback in response to a prompt while moving or modifying (824) the position and orientation of the AR shoe, and the resulting insight dataset (e.g., based on sentiment analysis of images (420), video (422), audio (424), transcription (424), etc.) may indicate that the respondent's sentiment towards the shoe varied based upon the position and orientation of the AR shoe (e.g., sentiment may be very positive while viewing the shoe from a side profile view, but may become negative when viewing the shoe from behind, or from below). In response, the system may provide a dynamic survey question, as has been described above, based on the position and orientation influenced insight dataset. As an example, such a dynamic survey question might include rendering the AR shoe at the position and orientation that elicited the most positive sentiment, and providing a prompt for the respondent to provide more audio/video responses describing what they particularly liked about that part of the shoe (e.g., "We noticed that you really liked the shoe from this angle, tell us why!" or prompting the respondent to touch the AR object rendered on their user device display touchscreen to indicate their favorite visual feature of the shoe from that angle (e.g., "We noticed that you really liked the shoe from this angle, touch the portion of the shoe that you think looks great!").

As an alternate example of incorporating (828) the position and orientation timeline into the insight dataset and providing (840) dynamic questioning based thereon, the system may produce additional inputs for the insight dataset based on the combination of the timeline with other respondent inputs (e.g., such as those shown in FIG. 6). These may include organizing and presenting (830) the insight dataset based on the AR object orientation, as described in the previous example. This may also include organizing and presenting (834) the insight dataset based on the AR object position within 3D space, relative to the respondent. For example, sentiment or another insight may change for the object relative to the distance from the respondent (e.g., insights indicate positive sentiment when viewed from afar, but sentiment becomes more negative when viewed proximately). As another example, sentiment or another insight may change for the object based on its position on the x-plane or y-plane position relative to the respondent (e.g., insights indicate positive sentiment when the AR object is positioned near a ceiling of a room, but sentiment becomes more negative as the AR object is moved towards the floor of the room).

As further example, the system may organize and present (832) insights based upon other physical, real-world objects that are detected as being proximate to the AR object. In this example, the system may analyze an image over which the AR object is rendered, and may identify a physical object or attributes of a physical object (e.g., using object recognition techniques) present within that image, which may be used to provide additional insights and/or provide (840) dynamic survey questions. For example, where the AR object is a shoe, the respondent may be prompted to position the AR shoe near the leg opening of a pair of pants that they would likely wear with the shoe. The system may capture that image and use object recognition techniques to determine the color, style, or other characteristic of the pants near which the shoe is placed which provides additional useful insights and opportunities for dynamic (840) questioning. As one example, the system may determine that the pants are blue, but that the respondent's sentiment was negative while the AR shoe was positioned there, and as a result may prompt the user: "Maybe blue wasn't a good choice, try it with a pair of black pants!" As another example, the system may determine that the pants are a blue jean material, and may prompt the user: "Looks good with blue jeans, now try it with something a little more formal!"

As further example, the system may organize and present (836) insights based upon other AR objects that are detected as being proximate to each other, for similar purposes as those described above in relation to proximate physical objects (832). For example, the survey interface may provide several AR objects, and may prompt the user to arrange them relative to each other in some manner (e.g., "Line the AR shoes up from right to left in order of your preference, from most favorite to least favorite" or "Arrange the AR with the AR pants that you think they look best with").

As further example, the system may organize and present (838) insights based upon the physical setting in which the AR object is placed. For example, the respondent may be prompted to move the AR object into the room of their dwelling in which they would most likely place or use the object (e.g., "Take this AR wall decoration and place it in the room you think it looks best in"), and the system may detect, based upon captured images or image sequences over which the AR object is rendered the type of physical room or setting, or characteristics of the physical room or setting based upon object recognition techniques. For example, this may include determining that the AR object was placed in a kitchen or living room based upon detection of objects commonly found in those spaces (e.g., a television, a refrigerator), or may include determining colors prevalent in the room, the level of lighting present in the room, or other characteristics that may be determined based upon captured images of the physical setting in which the AR object is placed. As with other examples, this may be used to provide additional insights and to provide (840) dynamic questioning (e.g., where the AR object is placed in a room determined to be a kitchen, the system may prompt the respondent to provide additional audio/video feedback: "Looks like you prefer the AR wall decoration in the kitchen, how did you come to that decision?").

Figure 17:
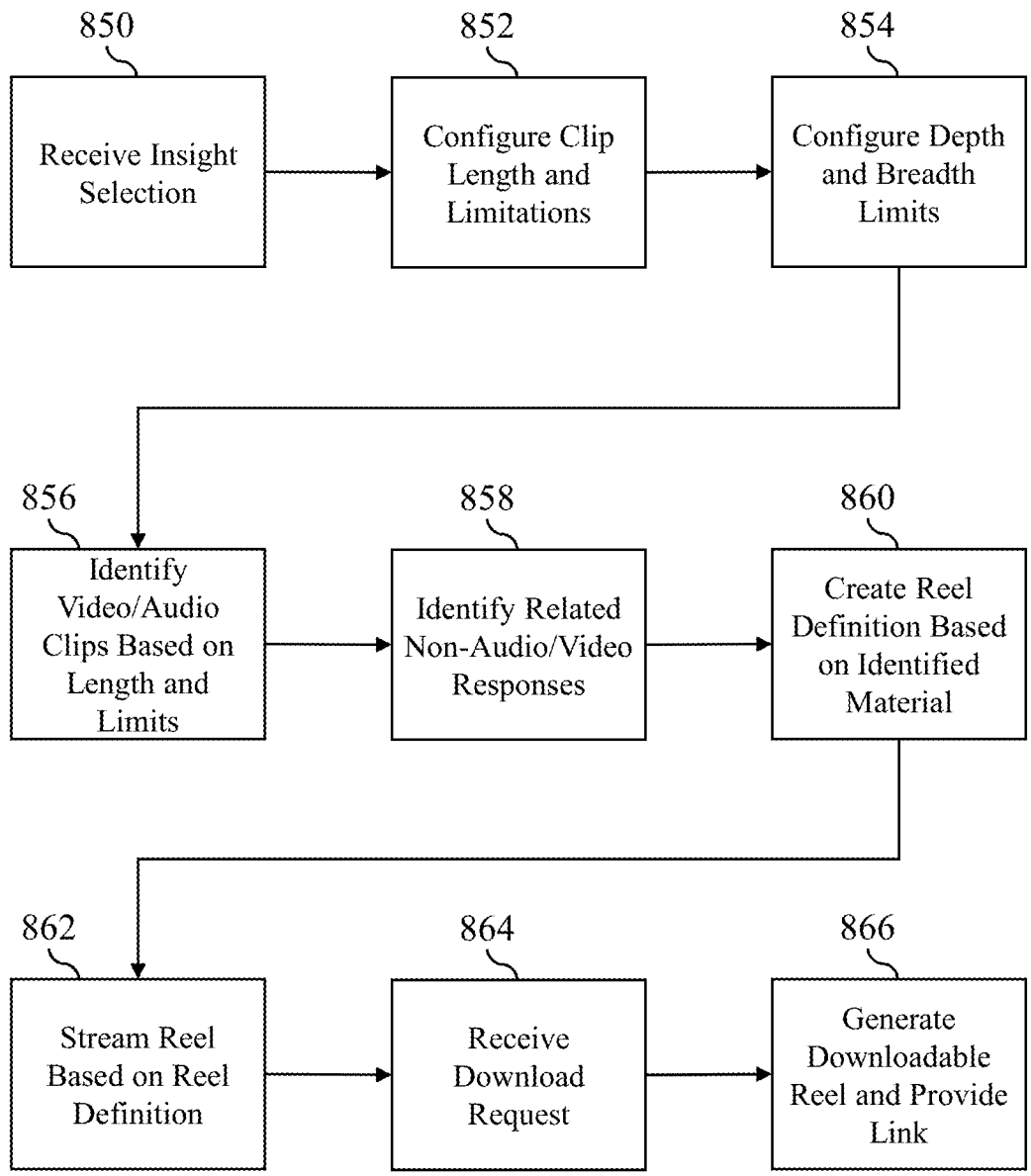
FIG. 17 is a flowchart of an exemplary set of steps that may be performed to organize a subset of mixed media responses for a selected insight into a viewable form.

FIG. 17 is a flowchart of an exemplary set of steps that may be performed to organize a subset of mixed media responses for a selected insight or topic into a viewable form. In some implementations of the disclosed technology, an administrative user that is viewing insights on certain topics may wish to view or consolidate some of the raw respondent inputs that contributed to the insight, similarly to the features shown in FIG. 12C (e.g., viewing vignettes from multiple respondents related to the insight). In addition to, or in the alternative to viewing a compilation of vignette videos, some implementations of the system may provide a flexibly configurable selection of respondent data for a selected insight, with such underlying respondent data being referred to as a "reel".

In such implementations, the system may receive (850) an insight selection from an administrative user that is viewing the data (e.g., a selection of positive or negative sentiment for a topic, a selection of all sentiment for a topic). This selection may be made while viewing and interactive with the insight dataset (e.g., such as illustrated in FIG. 12C), or may be configured to be triggered regularly based on a predetermined schedule (e.g., generate the same reel based upon a schedule). The selection may be configured (852) with limitations on the respondent content that is included in a reel, which may include configuring the maximum length of a video or audio subset that surrounds a single moment of respondent data (e.g., include 5 seconds of video occurring before and after a single moment where the user's sentiment on a selected insight peaked), configuring the maximum amount of free form text that surrounds a single moment of respondent data (e.g., include 10 words occurring before and after the single moment within the free form text where the user's sentiment for the selected insight peaked), and other preconfigured limitations intended to reduce the size of the reel, while maximizing the relevancy of the content it contains. The selection may also be configured (854) with certain depth and breadth limitations, which limit the amount of related insight data that may be included in the reel.

As an example with reference to FIG. 12C, where the insight selected for the reel is "cat", a depth limitation may be configured to limit the content included in the reel to only focus on cats generally (e.g., without extending into food, smell, hair, etc., specifically), or may be configured to allow for child content to be included to a certain depth or breadth (e.g., only include children to a depth of one, and limit the breadth of children at that depth to the 3 most common topics, most positive sentiment, most negative sentiment, or other limitation—which might result in respondent content being compiled into a reel for the selected insight, cat, as well as its 3 most commonly discussed sub-topics, hair, food, and smell). Depth limitations may also be configured to allow traversal to parent topics, such as where cat food is the selected insight, and the content included in the reel focuses on cat food but also includes content associated with the parent topic—cats generally.

The system may then, based upon the resulting selected topics and insights (e.g., cat, cat plus cat food, etc.) identify raw video and/or audio data from the originally received respondent inputs that are relevant to the selected topics and insights (e.g., either selected randomly from the respondent inputs, or selected based upon maximal or other relevant analysis results), and may identify (856) sub-clips from that video and/or audio data based on the clip limitations (e.g., limit each clip to no more than 10 seconds, limit aggregate duration of sub-clips to no more than 3 minutes).

The system may also identify (858) non audio/video respondent content for inclusion in the clap, which may include free form text responses, structured or strongly typed responses, AR object manipulation and interaction timelines, and other respondent inputs. The system may then create (860) a reel definition based on the identified (856) sub-clips and identified (858) other content. When creating (860) a sub-clip definition, the system may be configured to group the response data into relevant clusters (e.g., 10 video sub-clips showing positive sentiment on a selected insight or topic may be grouped together, followed by 10 video sub-clips showing negative sentiment grouped together, with related text and other identified respondent content displayed as an overlay on video clips or between clip transitions).

First creating (860) the reel as a definition (e.g., a collection of metadata that identifies the included content) instead of as newly generated files (e.g., such as a new video file produced from sub clips) allows the system to quickly create reels for selected topics and insights without greatly consuming processing capabilities or storage capabilities (e.g., the disk size required for a reel definition is insignificant in comparison to the disk size required for a new video file). The system may provide a viewing interface to an administrative user through which the reel may be streamed (862) and presented to the user based on the created (860) reel definition, with the component content being streamed from its original location in real-time based on the definition. The system may also receive (864) download requests from users for particular reels, and may generate (866) a downloadable reel and/or download link based on the reel definition. The downloadable reel may be created as a new video file, slide presentation, universal document format, or other file type, such that the requesting user may download, view, and share the reel as a new standalone file.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A system for conducting a survey to collect and analyze mixed medium responses from a plurality of respondents, the system comprising:
   (a) a server comprising a processor and a memory; and
   (b) a data storage configured to store sets of time-indexed raw response data received from the plurality of respondents and an insight dataset comprising the results of one or more analyses of the sets of time-indexed raw response data, wherein the one or more analyses include at least a multi-modal sentiment analysis of a plurality of topics described in the sets of time-indexed raw response data;
   wherein the processor is configured to:
   (i) provide a survey interface to a plurality of user devices associated with the plurality of respondents, wherein the survey interface is configured to receive a response dataset from each respondent that:
      (A) includes data of at least two response mediums; and
      (B) is organized on a time-index;
   (ii) determine a set of topics described in the response dataset based on a natural language processing of the response dataset, and add the response dataset to the stored sets of time-indexed raw response data;
   (iii) determine a sentiment for each of the set of topics based on a multi-modal sentiment analysis of the response dataset, and add the sentiment for each of the set of topics to the insight dataset, wherein the multi-modal sentiment analysis includes correlating individual sentiment analysis of the at least two response mediums with each other based on the time-index;
   (iv) provide an insight interface to an administrative device based on the insight dataset, wherein the administrative interface is configured to:
      (A) display a topic visualization that includes at least a description of a plurality of top-level topics from the plurality of topics and, for each of the plurality of top-level topic, includes a topic sentiment associated with that topic; and
      (B) provide a set of controls that may be interacted with to:
         (I) for any displayed topic, display a plurality of sub-topics that are associated with that displayed topic and, for each of the plurality of sub-topics, display the topic sentiment associated with that sub-topic; and (II) for any displayed topic, present raw response data from one or more respondents, from the sets of time-indexed raw response data, based on the time-index association between that displayed topic, the topic sentiment of the displayed topic, and the sets of time-indexed raw response data.

2. The system of claim 1, wherein the survey interface is configured to:
(i) display a sequence of pre-configured text prompts, wherein each of the sequence of pre-configured text prompts include a question or instruction for providing the response dataset to the survey interface; and
(ii) for each of the sequence of pre-configured text prompts, display a set of response controls configured to receive response data that includes at least two response mediums.

3. The system of claim 2, wherein the set of response controls are configured to receive, as the at least two response mediums, a quantitative response and qualitative response.

4. The system of claim 2, wherein the set of response controls are configured to receive, as the at least two response mediums, a video response, wherein the processor is further configured to, when performing the multi-modal sentiment analysis of the video response:
(i) use images from the video response as a first medium;
(ii) use audio from the video response as a second medium; and
(iii) create a text transcript based on the audio, and use the text transcript as a third medium, wherein the natural language processing of the response dataset is based on the text transcript.

5. The system of claim 4, wherein the processor is configured to, when presenting raw response data from one or more respondents via the insight interface for that displayed topic:
(i) select a set of relevant video and audio from the video response based on the time-index association with that displayed topic for display; and
(ii) omit any portion of the video response other than the set of relevant video and audio.

6. The system of claim 2, wherein the set of response controls are configured to receive, as the at least two response mediums, a numerical quantitative response, a text qualitative response, and a video qualitative response, wherein the processor is further configured to, when performing the multi-modal sentiment analysis of the response dataset:
(i) use the numerical quantitative response as a first medium;
(ii) use the text qualitative response as a second medium, wherein the natural language processing of the response dataset is based on the text qualitative response; and
(iii) use the video qualitative response as a third medium.

7. The system of claim 2, wherein the survey interface is configured to display a sequence of survey screens, wherein each of the sequence of survey screens includes at least one text prompt and at least one response control, and wherein the processor is further configured to:
(i) receive a portion of the response dataset via a first survey screen from the sequence of survey screens;
(ii) after performing the multi-modal sentiment analysis for a topic of the set of topics that is reflected in the portion of the response dataset, create a dynamic real time question based on the sentiment for the topic, wherein the dynamic real time question is associated with at least one text prompt and at least one response control;
(ii) in parallel with creating the dynamic real time question:
(A) if the dynamic real time question is not yet created, cause the survey interface to display the next survey screen in the sequence of survey screens as a subsequent survey screen; and
(B) if the dynamic real time is created, cause the survey interface to display a dynamic survey screen that includes the at least one text prompt and the at least one response control as the subsequent survey screen.

8. The system of claim 1, wherein the data storage is further configured to store configurations for an augmented reality object that is associated with one or more topics of the plurality of topics, and wherein the survey interface is configured to, on a user device:
(i) display the augmented reality object on a display of the user device as an overlay upon an image captured by a camera of the user device;
(ii) provide a set of user controls that may be interacted with to modify a rotational orientation of the overlay of the augmented reality object.

9. The system of claim 8, wherein the processor is further configured to receive, as the at least two response mediums, a video response and an augmented reality object response, wherein:
(i) the augmented reality object response includes a timeline of the rotational orientation of the overlay that is organized on the time-index; and
(ii) performing the multi-modal analysis includes determining the sentiment for each of the set of topics based on the time-index association between:
(A) individual sentiment for a time period from the video response; and
(B) the rotational orientation of the augmented reality object during the time period.

10. The system of claim 9, wherein the configurations for the augmented reality object include an association of a particular rotational orientation with a feature topic that describes a particular characteristic of the augmented reality object.

11. A method for conducting a survey to collect and analyze mixed medium responses from a plurality of respondents, the method comprising, by a processor:
(a) storing, on a data storage, sets of time-indexed raw response data received from the plurality of respondents and an insight dataset comprising the results of one or more analyses of the sets of time-indexed raw response data, wherein the one or more analyses include at least a multi-modal sentiment analysis of a plurality of topics described in the sets of time-indexed raw response data;
(b) providing a survey interface to a plurality of user devices associated with the plurality of respondents, wherein the survey interface is configured to receive a response dataset from each respondent that:
(i) includes data of at least two response mediums; and
(ii) is organized on a time-index;
(c) determining a set of topics described in the response dataset based on a natural language processing of the response dataset, and adding the response dataset to the stored sets of time-indexed raw response data;
(d) determining a sentiment for each of the set of topics based on a multi-modal sentiment analysis of the response dataset, and adding the sentiment for each of the set of topics to the insight dataset, wherein the multi-modal sentiment analysis includes correlating individual sentiment analysis of the at least two response mediums with each other based on the time-index;
(e) providing an insight interface to an administrative device based on the insight dataset, wherein the administrative interface is configured to:
(i) display a topic visualization that includes at least a description of a plurality of top-level topics from the plurality of topics and, for each of the plurality of top-level topic, includes a topic sentiment associated with that topic; and
(ii) provide a set of controls that may be interacted with to:
(A) for any displayed topic, display a plurality of sub-topics that are associated with that displayed topic and, for each of the plurality of sub-topics, display the topic sentiment associated with that sub-topic; and
(B) for any displayed topic, present raw response data from one or more respondents, from the sets of time-indexed raw response data, based on the time-index association between that displayed topic, the topic sentiment of the displayed topic, and the sets of time-indexed raw response data.

12. The method of claim 11, wherein the survey interface is configured to:
(i) display a sequence of pre-configured text prompts, wherein each of the sequence of pre-configured text prompts include a question or instruction for providing the response dataset to the survey interface; and
(ii) for each of the sequence of pre-configured text prompts, display a set of response controls configured to receive response data that includes at least two response mediums.

13. The method of claim 12, wherein the set of response controls are configured to receive, as the at least two response mediums, a quantitative response and qualitative response.

14. The method of claim 12, wherein the set of response controls are configured to receive, as the at least two response mediums, a video response, the method further comprising, when performing the multi-modal sentiment analysis of the video response:
(i) using images from the video response as a first medium;
(ii) using audio from the video response as a second medium; and
(iii) creating a text transcript based on the audio, and using the text transcript as a third medium, wherein the natural language processing of the response dataset is based on the text transcript.

15. The method of claim 14, further comprising, when presenting raw response data from one or more respondents via the insight interface for that displayed topic:
(i) selecting a set of relevant video and audio from the video response based on the time-index association with that displayed topic for display; and
(ii) omitting any portion of the video response other than the set of relevant video and audio.

16. The method of claim 12, wherein the set of response controls are configured to receive, as the at least two response mediums, a numerical quantitative response, a text qualitative response, and a video qualitative response, the method further comprising, when performing the multi-modal sentiment analysis of the response dataset:
(i) using the numerical quantitative response as a first medium;
(ii) using the text qualitative response as a second medium, wherein the natural language processing of the response dataset is based on the text qualitative response; and
(iii) using the video qualitative response as a third medium.

17. The method of claim 12, wherein the survey interface is configured to display a sequence of survey screens, wherein each of the sequence of survey screens includes at least one text prompt and at least one response control, the method further comprising:
(i) receiving a portion of the response dataset via a first survey screen from the sequence of survey screens;
(ii) after performing the multi-modal sentiment analysis for a topic of the set of topics that is reflected in the portion of the response dataset, creating a dynamic real time question based on the sentiment for the topic, wherein the dynamic real time question is associated with at least one text prompt and at least one response control;
(ii) in parallel with creating the dynamic real time question:
(A) if the dynamic real time question is not yet created, causing the survey interface to display the next survey screen in the sequence of survey screens as a subsequent survey screen; and
(B) if the dynamic real time is created, causing the survey interface to display a dynamic survey screen that includes the at least one text prompt and the at least one response control as the subsequent survey screen.

18. The method of claim 11, wherein the data storage is further configured to store configurations for an augmented reality object that is associated with one or more topics of the plurality of topics, and wherein the survey interface is configured to, on a user device:
(i) display the augmented reality object on a display of the user device as an overlay upon an image captured by a camera of the user device;
(ii) provide a set of user controls that may be interacted with to modify a rotational orientation of the overlay of the augmented reality object.

19. The method of claim 18, the method further comprising, as the at least two response mediums, a video response and an augmented reality object response, wherein:
(i) the augmented reality object response includes a timeline of the rotational orientation of the overlay that is organized on the time-index; and
(ii) performing the multi-modal analysis includes determining the sentiment for each of the set of topics based on the time-index association between:
(A) individual sentiment for a time period from the video response; and
(B) the rotational orientation of the augmented reality object during the time period.

20. A system for conducting a survey to collect and analyze mixed medium responses from a plurality of respondents, the system comprising:
(a) a server comprising a processor and a memory; and
(b) a data storage configured to store sets of time-indexed raw response data received from the plurality of respondents and an insight dataset comprising the results of one or more analyses of the sets of time-indexed raw response data, wherein the one or more analyses include at least a multi-modal sentiment analysis of a plurality of topics described in the sets of time-indexed raw response data;

wherein the processor is configured to:
(i) provide a survey interface to a plurality of user devices associated with the plurality of respondents, wherein the survey interface is configured to:
  (A) receive a response dataset from each respondent that includes data of at least two response mediums; and is organized on a time-index;
  (B) display an augmented reality object on a display of a user device as an overlay upon an image captured by a camera of the user device; and
  (C) provide a set of user controls that may be interacted with to modify a rotational orientation of the overlay of the augmented reality object;
(ii) determine a set of topics described in the response dataset based on a natural language processing of the response dataset, and add the response dataset to the stored sets of time-indexed raw response data;
(iii) determine a sentiment for each of the set of topics based on a multi-modal sentiment analysis of the response dataset, and add the sentiment for each of the set of topics to the insight dataset, wherein the multi-modal sentiment analysis includes correlating individual sentiment analysis of the at least two response mediums with each other based on the time-index;
(iv) provide an insight interface to an administrative device based on the insight dataset, wherein the administrative interface is configured to:
  (A) display a topic visualization that includes at least a description of a plurality of top-level topics from the plurality of topics and, for each of the plurality of top-level topic, includes a topic sentiment associated with that topic; and
  (B) provide a set of controls that may be interacted with to:
    (I) for any displayed topic, display a plurality of sub-topics that are associated with that displayed topic and, for each of the plurality of sub-topics, display the topic sentiment associated with that sub-topic; and
    (II) for any displayed topic, present raw response data from one or more respondents, from the sets of time-indexed raw response data, based on the time-index association between that displayed topic, the topic sentiment of the displayed topic, and the sets of time-indexed raw response data; and
(v) receive, as the at least two response mediums, a video response and an augmented reality object response, wherein:
  (i) the augmented reality object response includes a timeline of the rotational orientation of the overlay that is organized on the time-index; and
  (ii) performing the multi-modal analysis includes determining the sentiment for each of the set of topics based on the time-index association between:
    (A) individual sentiment for a time period from the video response; and
    (B) the rotational orientation of the augmented reality object during the time period.

* * * * *